(12) United States Patent
Ikriannikov

(10) Patent No.: US 8,237,530 B2
(45) Date of Patent: Aug. 7, 2012

(54) COUPLED INDUCTOR WITH IMPROVED LEAKAGE INDUCTANCE CONTROL

(75) Inventor: Alexandr Ikriannikov, Castro Valley, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 104 days.

(21) Appl. No.: 12/830,849

(22) Filed: Jul. 6, 2010

(65) Prior Publication Data

US 2011/0032068 A1 Feb. 10, 2011

Related U.S. Application Data

(63) Continuation-in-part of application No. 12/538,707, filed on Aug. 10, 2009, now Pat. No. 8,102,233.

(51) Int. Cl.
*H01F 5/00* (2006.01)
*H01F 17/06* (2006.01)
*H01F 27/28* (2006.01)

(52) U.S. Cl. ......... 336/178; 336/200; 336/212; 336/222

(58) Field of Classification Search .................. None
See application file for complete search history.

(56) References Cited

U.S. PATENT DOCUMENTS

| | | | |
|---|---|---|---|
| 2,212,543 A | 8/1940 | Jovy | |
| 3,448,421 A * | 6/1969 | Berg et al. | 336/84 R |
| 3,878,495 A | 4/1975 | Thomas | |
| 3,988,665 A | 10/1976 | Neumaier et al. | |
| 4,455,545 A | 6/1984 | Shelly | |
| 4,488,136 A | 12/1984 | Hansen et al. | |
| 4,531,085 A | 7/1985 | Mesenhimer | |
| 4,800,479 A | 1/1989 | Bupp | |
| 5,003,277 A | 3/1991 | Sokai et al. | |
| 5,123,989 A | 6/1992 | Horiishi et al. | |
| 5,161,098 A | 11/1992 | Balakrishnan | |
| 5,177,460 A | 1/1993 | Dhyanchand et al. | |
| 5,182,535 A | 1/1993 | Dhyanchand | |
| 5,225,971 A | 7/1993 | Spreen | |
| 5,353,001 A | 10/1994 | Meinel et al. | |
| 5,436,818 A | 7/1995 | Barthold | |

(Continued)

FOREIGN PATENT DOCUMENTS

DE 922 423 1/1955

(Continued)

OTHER PUBLICATIONS

PCT/US10/45013, Response to Written Opinion filed on Jun. 9, 2011, 30 pages.

(Continued)

*Primary Examiner* — Anh Mai
(74) *Attorney, Agent, or Firm* — Lathrop & Gage, LLP

(57) ABSTRACT

An M-winding coupled inductor includes a first end magnetic element, a second end magnetic element, M connecting magnetic elements, and M windings. M is an integer greater than one. Each connecting magnetic element is disposed between and connects the first and second end magnetic elements. Each winding is wound at least partially around a respective one of the M connecting magnetic elements. The coupled inductor further includes at least one top magnetic element adjacent to and extending at least partially over at least two of the M connecting magnetic elements to provide a magnetic flux path between the first and second end magnetic elements. The inductor may be included in an M-phase power supply, and the power supply may at least partially power a computer processor.

25 Claims, 15 Drawing Sheets

U.S. PATENT DOCUMENTS

| | | | |
|---|---|---|---|
| 5,469,334 A | 11/1995 | Balakrishnan | |
| 5,565,837 A | 10/1996 | Godek et al. | |
| 5,568,111 A | 10/1996 | Metsler | |
| 5,594,402 A | 1/1997 | Krichtafovitch et al. | |
| 5,631,822 A | 5/1997 | Siberkleit et al. | |
| 5,764,500 A | 6/1998 | Matos | |
| 5,939,966 A | 8/1999 | Shin' Ei | |
| 6,018,468 A | 1/2000 | Archer et al. | |
| 6,060,977 A | 5/2000 | Yamamoto et al. | |
| 6,114,932 A | 9/2000 | Wester et al. | |
| 6,198,375 B1 | 3/2001 | Shafer | |
| 6,204,744 B1 | 3/2001 | Shafer et al. | |
| 6,348,848 B1 | 2/2002 | Herbert | |
| 6,356,179 B1 | 3/2002 | Yamada | |
| 6,362,986 B1 | 3/2002 | Schultz et al. | |
| 6,377,155 B1 | 4/2002 | Allen et al. | |
| 6,420,953 B1 | 7/2002 | Dadafshar | |
| 6,449,829 B1 | 9/2002 | Shafer | |
| 6,460,244 B1 | 10/2002 | Shafer et al. | |
| 6,538,909 B2 | 3/2003 | Goodarzi et al. | |
| 6,549,111 B1 | 4/2003 | De Graaf et al. | |
| 6,578,253 B1 | 6/2003 | Herbert | |
| 6,714,428 B2 | 3/2004 | Huang et al. | |
| 6,737,951 B1 | 5/2004 | Decristofaro et al. | |
| 6,774,758 B2 | 8/2004 | Gokhale et al. | |
| 6,784,644 B2 | 8/2004 | Xu et al. | |
| 6,867,678 B2 | 3/2005 | Yang | |
| 6,903,648 B2 | 6/2005 | Baumann et al. | |
| 6,906,601 B2 | 6/2005 | Fayyaz | |
| 6,922,883 B2 | 8/2005 | Gokahle et al. | |
| 6,965,290 B2 | 11/2005 | Gokahle et al. | |
| 6,979,980 B1 | 12/2005 | Hesterman et al. | |
| 6,980,077 B1 | 12/2005 | Chandrasekaran et al. | |
| 7,034,645 B2 | 4/2006 | Shafer et al. | |
| 7,148,661 B2 | 12/2006 | Trainer et al. | |
| 7,187,263 B2 | 3/2007 | Vinciarelli | |
| 7,199,695 B1 | 4/2007 | Zhou et al. | |
| 7,233,132 B1 | 6/2007 | Dong et al. | |
| 7,239,530 B1 | 7/2007 | Djekic et al. | |
| 7,248,139 B1 | 7/2007 | Podlisk et al. | |
| 7,280,025 B2 | 10/2007 | Sano | |
| 7,352,269 B2 | 4/2008 | Li et al. | |
| 7,423,894 B2 | 9/2008 | Ilic | |
| 7,498,920 B2 | 3/2009 | Sullivan et al. | |
| 7,525,406 B1 | 4/2009 | Cheng | |
| 2002/0067234 A1 | 6/2002 | Kung | |
| 2002/0159282 A1 | 10/2002 | Perol | |
| 2003/0115013 A1 | 6/2003 | Dendinger | |
| 2004/0017276 A1 | 1/2004 | Chen et al. | |
| 2004/0085173 A1 | 5/2004 | Decristofaro et al. | |
| 2005/0024179 A1 | 2/2005 | Chandrasekaran et al. | |
| 2006/0049907 A1 | 3/2006 | Liu | |
| 2006/0158297 A1 | 7/2006 | Sutardja | |
| 2006/0197510 A1 | 9/2006 | Chandrasekaran | |
| 2006/0279972 A1 | 12/2006 | Shao et al. | |
| 2007/0097571 A1 | 5/2007 | Dinh et al. | |
| 2007/0175701 A1 | 8/2007 | Xu et al. | |
| 2007/0176726 A1 | 8/2007 | Xu et al. | |
| 2007/0268104 A1 | 11/2007 | Chan et al. | |
| 2008/0024259 A1 | 1/2008 | Chandrasekaran et al. | |
| 2008/0150666 A1 | 6/2008 | Chandrasekaran et al. | |
| 2008/0169769 A1 | 7/2008 | Lee | |
| 2008/0205098 A1 | 8/2008 | Xu et al. | |
| 2008/0246577 A1 | 10/2008 | Sullivan et al. | |
| 2009/0001945 A1 | 1/2009 | Wickersham et al. | |
| 2009/0179723 A1 | 7/2009 | Ikriannikov et al. | |
| 2009/0231081 A1 | 9/2009 | Ikriannikov et al. | |
| 2009/0237197 A1 | 9/2009 | Ikriannikov et al. | |

FOREIGN PATENT DOCUMENTS

| | | |
|---|---|---|
| DE | 26 53 568 | 6/1978 |
| DE | 3123006 | 1/1983 |
| DE | 37 03 561 | 8/1988 |
| DE | 101 05 087 | 8/2001 |
| EP | 0 012 629 | 6/1980 |
| EP | 0 142 207 | 5/1985 |
| EP | 0 225 830 | 6/1987 |
| EP | 0 577 334 | 1/1994 |
| EP | 0 755 060 | 1/1997 |
| EP | 1 519 392 | 3/2005 |
| EP | 1 632 964 | 3/2006 |
| EP | 1 835 604 | 9/2007 |
| EP | 1 950 773 | 7/2008 |
| JP | 60-015908 | 1/1985 |
| JP | 11 144983 | 5/1999 |
| JP | 11 307369 | 11/1999 |
| JP | 2002057049 | 2/2002 |
| WO | WO 2006/026674 | 3/2006 |

OTHER PUBLICATIONS

Dong et al., Twisted Core Coupled Inductors for Microprocessor Voltage Regulators, Power Electronics Specialists Conference, pp. 2386-2392, Jun. 17-21, 2007.

Dong et al., The Short Winding Path Coupled Inductor Voltage Regulators, Applied Power Electronics Conference and Exposition, pp. 1446-1452, Feb. 24-28, 2008.

Dong et al., Evaluation of Coupled Inductor Voltage Regulators, Applied Power Electronics Conference and Exposition, pp. 831-837, Feb. 24-28, 2008.

Panasonic, Power Choke Coil, 2 pages, Jan. 2008.

Pulse, SMT Power Inductors datasheet, 2 pages, Nov. 2007.

Pulse, SMT Power Inductors Power Beads—PA0766NL Series; pp. 53-55; Mar. 2006.

Wong, Pit-Leong, et al., "Investigating Coupling Inductors in the Interleaving QSW VRM" Applied Power Electronics Conference and Exposition, 2000. APEC 2000. Fifteenth Annual IEEE; Mar. 2000; pp. 973-978.

Wong, Pit-Leong, et al.; A Novel Modeling Concept for Multi-coupling Core Structures; Center for Power Electronics Systems; IEEE; pp. 1-7; 2001.

Wong, Pit-Leong, et al.; Performance Improvements of Interleaving VRMs With Coupling Inductors, IEEE Transactions on Power Electronics; vol. 16, No. 4; pp. 499-507; Jul. 2001.

Xu, J., et al; Analysis by Finite Element Method of a Coupled Inductor Circuit Used as Current Injection Interface; IEEE; pp. 147-151; 1996.

PCT/US09/37315 International Search Report and Written Opinion mailed Aug. 26, 2009, 13 pages.

Cooper Bussmann, "Product Data Sheet for Low Profile Inductor (Surface Mount)" retrieved from http://www.angliac.com, May 2003.

Vishay, Low Profile, High Current IHLP Inductor data sheet, Jan. 21, 2009, 3 pages.

U.S. Appl. No. 12/404,993, Office Action mailed Jan. 4, 2010, 25 pages.

U.S. Appl. No. 12/404,993, Response to Office Action filed Apr. 5, 2010, 30 pages.

U.S. Appl. No. 12/404,993, Office Action mailed Jun. 28, 2010, 31 pages.

PCT Application No. PCT/US09/37315, Response to Written Opinion filed Jan. 14, 2010, 31 pages.

PCT Application No. PCT/US09/37315, International Preliminary Report on Patentability mailed Jul. 7, 2010; 8 pages.

PCT/US10/45013 International Search Report and Written Opinion mailed Jan. 21, 2011, 15 pages.

Chandrasekaran, S. & Gokdere, L.U., Integrated Magnetics for Interleaved DC-DC Boost Converter for Fuel Cell Powered Vehicles, 2004, 35th Annual IEEE Power Electronics Specialists Conf., pp. 356-361.

U.S. Appl. No. 12/404,993, Response to Office Action filed Oct. 22, 2010, 27 pages.

* cited by examiner

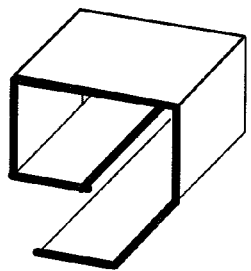
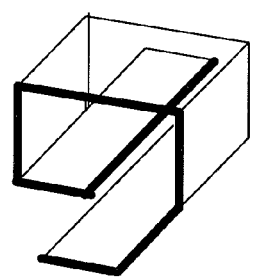
FIG. 14   FIG. 15
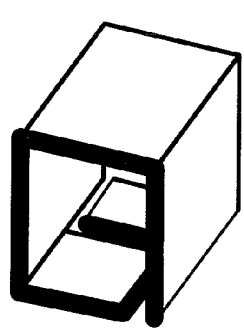
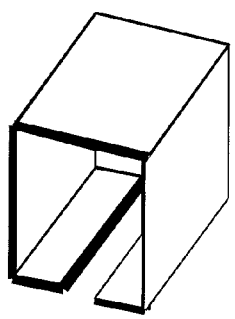
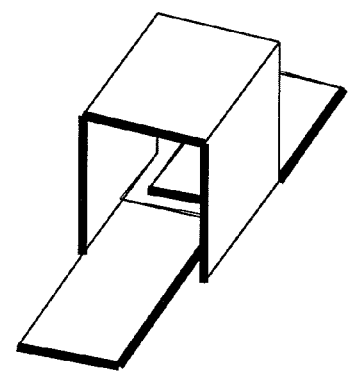
FIG. 16   FIG. 17   FIG. 18
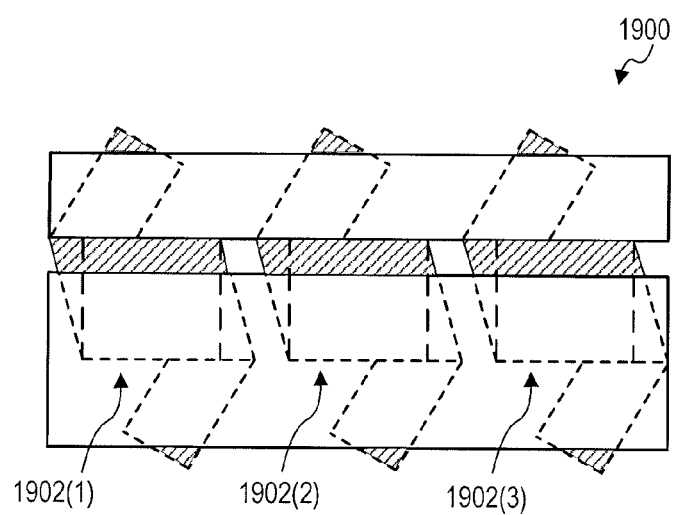
FIG. 19

COUPLED INDUCTOR WITH IMPROVED LEAKAGE INDUCTANCE CONTROL

CROSS-REFERENCE TO RELATED APPLICATION

This application is a continuation-in-part of U.S. patent application Ser. No. 12/538,707, filed Aug. 10, 2009, which is incorporated herein by reference.

BACKGROUND

Switching DC-to-DC converters having a multiphase coupled inductor topology are described in U.S. Pat. No. 6,362,986 to Schultz et al. ("Shultz '986"), the disclosure of which is incorporated herein by reference. These converters have advantages, including reduced ripple current in the inductors and the switches, which enables reduced per-phase inductance or reduced switching frequency over converters having conventional multi-phase DC-to-DC converter topologies. As a result, DC-to-DC converters with magnetically coupled inductors achieve a superior transient response without an efficiency penalty compared with conventional multiphase topologies. This allows a significant reduction in output capacitance resulting in smaller, lower cost solutions.

As discussed in Schultz '986, performance of a DC-to-DC converter utilizing a coupled inductor is affected by the coupled inductor's leakage inductance. Accordingly, it may desirable to customize or adjust a coupled inductor's leakage inductance for the inductor's application.

Some coupled inductors have been previously proposed. For example, FIGS. 1-3 show one coupled inductor 100 developed by Volterra Semiconductor Corporation. In particular, FIG. 1 shows a side plan view, FIG. 2 shows a cross sectional view, and FIG. 3 shows an end plan view of coupled inductor 100. Coupled inductor 100, which has a height 106, includes a magnetic core 102 and two or more windings 104. FIG. 4 shows a side perspective view of one winding 104 of coupled inductor 100.

As another example, Dong et al. propose a two phase "twisted core" coupled inductor in a paper entitled "Twisted Core Coupled Inductors for Microprocessor Voltage Regulators." However, this coupled inductor has a complex core with poor volume utilization. Additionally, leakage inductance is defined by the distance between vertical core structures and the height of these structures—accordingly, leakage inductance is difficult to control. Furthermore, the twisted core coupled inductor's leakage path makes the inductor's design complex.

Additionally, Dong et al. propose coupled inductors in a paper entitled "The Short Winding Path Coupled Inductor Voltage Regulators." FIG. 5 shows a top plan view of one coupled inductor 500, which represents the multiphase coupled inductors of this Dong paper. Windings are not shown in FIG. 5 to more clearly show core 502. However, FIG. 6 shows inductor 500 including its windings 602.

Core 502 includes a respective leg 504 for each phase. Each leg 504 has a width 508, and adjacent legs 504 are separated by a window 506 having a width 510. Accordingly, windings 602 have a pitch 604, as shown in FIGS. 6 and 7. Window widths 510 are relatively large and are on the order of leg widths 508. Large window widths 510 are required to provide space for leakage sections 512, which are needed to provide a path for magnetic flux so that leakage inductance is sufficiently large. Leakage inductance is changed by varying the size and/or shape of leakage sections 512, which may require changing the size and/or shape of core 502. Windows 506 also accommodate a respective winding tab, as shown in FIG. 6.

FIG. 7 shows a cross sectional view of inductor 500 along line A-A of FIG. 5. Each area 702 corresponds to the area of a respective leg 504, and each area 704 corresponds to the area of a respective leakage section 512. Thickness of windings 602 are exaggerated in FIG. 7 for illustrative clarity. As seen from FIGS. 5-7, significant space between windings 602 is required to control leakage inductance via leakage sections 512.

SUMMARY

In an embodiment, an M-winding coupled inductor includes a first end magnetic element, a second end magnetic element, M connecting magnetic elements, and M windings. M is an integer greater than one. Each connecting magnetic element is disposed between and connects the first and second end magnetic elements. Each winding is wound at least partially around a respective one of the M connecting magnetic elements. The coupled inductor further includes at least one top magnetic element adjacent to and extending at least partially over at least two of the M connecting magnetic elements to provide a path for magnetic flux between the first and second end magnetic elements.

In an embodiment, an M-phase power supply includes a coupled inductor and M switching circuits. M is an integer greater than one. The coupled inductor includes a first end magnetic element, a second end magnetic element, M connecting magnetic elements, and M windings. Each connecting magnetic element is disposed between and connects the first and second end magnetic elements. Each winding is wound at least partially around a respective one of the M connecting magnetic elements. Each winding has a respective first end and a respective second end, and each first end is electrically coupled to a common first node. The coupled inductor further includes at least one top magnetic element adjacent to and extending at least partially over at least two of the M connecting magnetic elements to provide a path for magnetic flux between the first and second end magnetic elements. Each switching circuit is electrically coupled to the second end of a respective winding and configured to switch the second end between at least two different voltages.

BRIEF DESCRIPTION OF DRAWINGS

FIGS. 14-18 shows side perspective views of examples of windings that could be used with the coupled inductor of FIG. 8.

FIG. 19 shows a top plan view an embodiment of the coupled inductor of FIG. 8 with an alternate winding configuration.

DETAILED DESCRIPTION OF EMBODIMENTS

Figure 1:
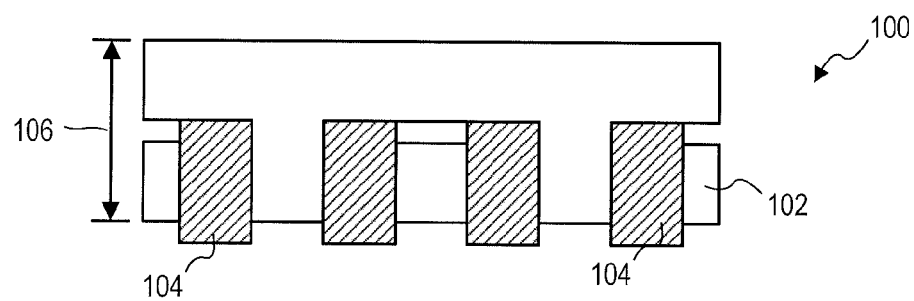
FIG. 1 shows a side plan view of one PRIOR ART multiphase coupled inductor.

It is noted that, for purposes of illustrative clarity, certain elements in the drawings may not be drawn to scale. Specific instances of an item may be referred to by use of a numeral in parentheses (e.g., winding 904(1)) while numerals without parentheses refer to any such item (e.g., windings 904).

Figure 8:
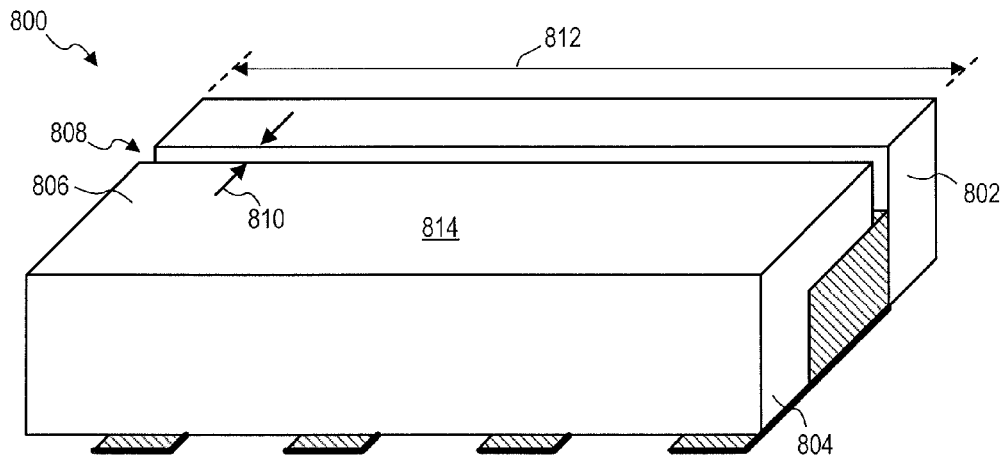
FIG. 8 shows a side perspective view of one coupled inductor, according to an embodiment.

FIG. 8 shows a side perspective view of one M-winding coupled inductor 800. Coupled inductor 800 is shown with M being equal to four. However, M could be any integer greater than one. Coupled inductor 800 includes a first end magnetic element 802, a second end magnetic element 804, and a top magnetic element 806, each of which is formed of a magnetic material (e.g., a ferrite material and/or a powdered iron material). First and second end magnetic elements 802, 804 are, for example, parallel to each other. Although second end magnetic element 804 and top magnetic element 806 are shown as combined into a single magnetic element, these magnetic elements could be discrete magnetic elements. In some embodiments, top magnetic element 806 forms an at least substantially planar surface 814, which may facilitate automatic placement of coupled inductor 800 without requiring a sticker on the top of inductor 800.

Top magnetic element 806 provides a path for magnetic flux to travel between first end magnetic element 802 and second end magnetic element 804. Thus, top magnetic element 806 provides a path for leakage magnetic flux, which contributes to leakage inductance values of windings of inductor 800. Top magnetic element 806 also forms a gap 808 having a thickness 810. Although gap 808 is shown as extending along the entirety of length 812 of coupled inductor 800, gap 808 could be configured to extend along only a portion of length 812, such as if non-linear leakage inductance values are desired.

Figure 9:
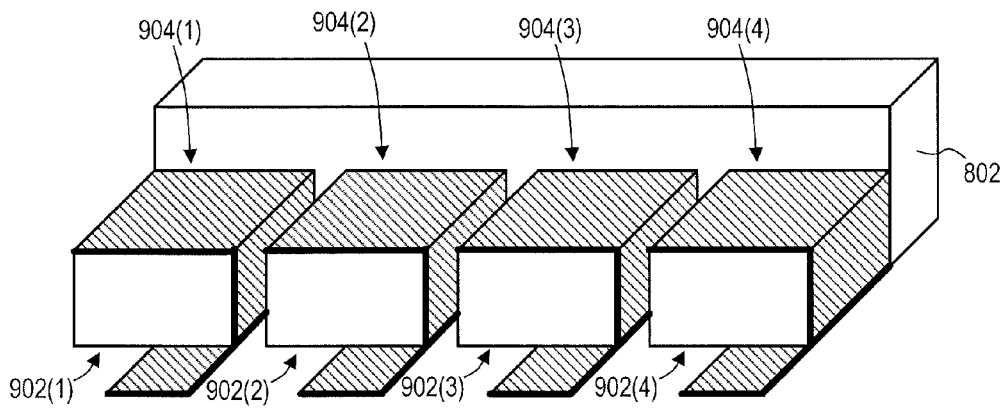
FIG. 9 shows a side perspective view of the coupled inductor of FIG. 8 with magnetic elements removed.
Figure 10:
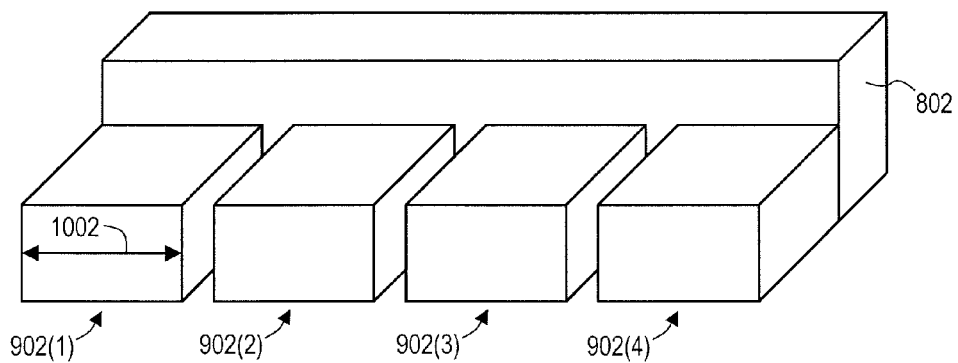
FIG. 10 shows another side perspective view of the coupled inductor of FIG. 8 with magnetic elements and windings removed.

FIG. 9 shows a side perspective view of coupled inductor 800 with second end magnetic element 804 and top magnetic element 806 removed to show connecting magnetic elements 902 and windings 904. Coupled inductor 800 includes M connecting magnetic elements 902 formed of a magnetic material, disposed between and connecting first and second end magnetic elements 802, 804. Thus, top magnetic element 806 is adjacent to and extends at least partially over each of the connecting magnetic elements 902. A respective winding 904 (shown with cross-hatch) is wound at least partially around a respective one of the M connecting magnetic elements 902. FIG. 10 shows a side perspective view of coupled inductor 800 with second end magnetic element 804, top magnetic element 806, and windings 904 removed in order to better show connecting magnetic elements 902. Each connecting magnetic element 902 has a respective width 1002. Although connecting magnetic elements 902 are shown as being rectangular and having equal widths 1002, their shapes may be varied (e.g., rounded), and each instance of connecting magnetic element 902 need not have an identical width 1002.

Gap 808 includes (e.g., is at least partially filled with) a material having a lower magnetic permeability than the one or more magnetic materials forming first end magnetic element 802, second end magnetic element 804, top magnetic element 806, and connecting magnetic elements 902. For example, gap 808 may include a non-magnetic material such as air, insulating tape, plastic, glue, and/or paper. As another example, gap 808 may optionally include a saturable magnetic material that saturates during anticipated normal operation of coupled inductor 800, so that windings 904 have non-linear leakage inductance values. Top magnetic element 806 and gap 808 are typically the most significant contributors to the respective leakage inductance of each winding 904. Accordingly, leakage inductance may be varied by varying thickness 810 of gap 808, where leakage inductance increases in proportion to thickness 810.

Figure 11:
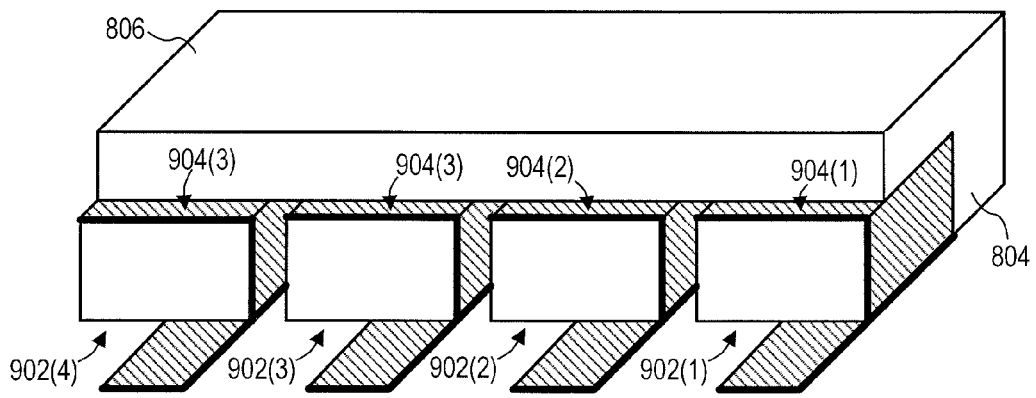
FIG. 11 shows yet another side perspective view of the coupled inductor of FIG. 8 with a magnetic element removed.
Figure 12:
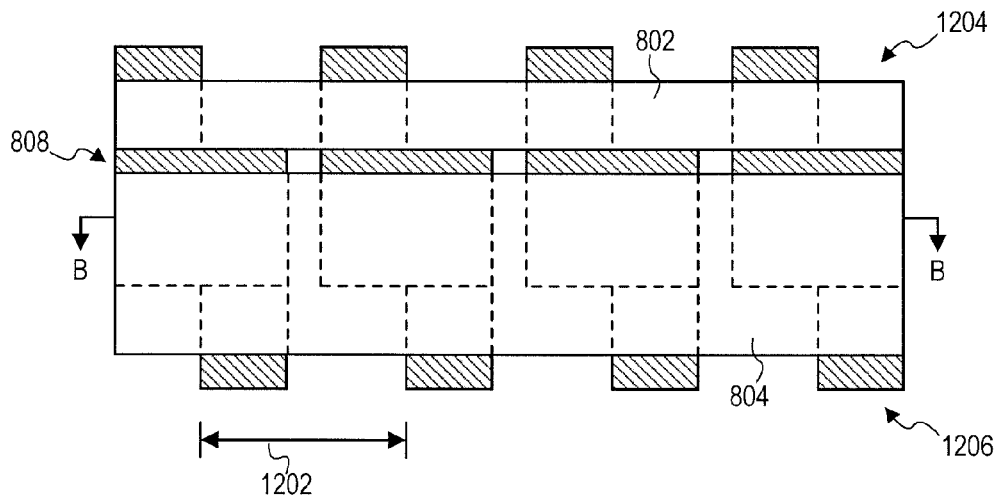
FIG. 12 shows a top plan view of the coupled inductor of FIG. 8.

FIG. 11 shows inductor 800 from a side perspective opposite of that of FIGS. 8-10. In FIG. 11, first end magnetic element 802 is removed. FIG. 12 is a top plan view of coupled inductor 800, where dashed lines indicate the outlines of windings 904 where obscured by magnetic elements. Windings 904 have a pitch 1202, which is, for example, equal to a pitch of power stages of a DC-to-DC converter that coupled inductor 800 is installed in to minimize circuit board trace length and to maximize DC-to-DC converter power density. Although pitch 1202 is shown as being the same for each pair of windings 904, pitch 1202 could vary among pairs of windings, such as to accommodate power stage geometry.

Figure 13:
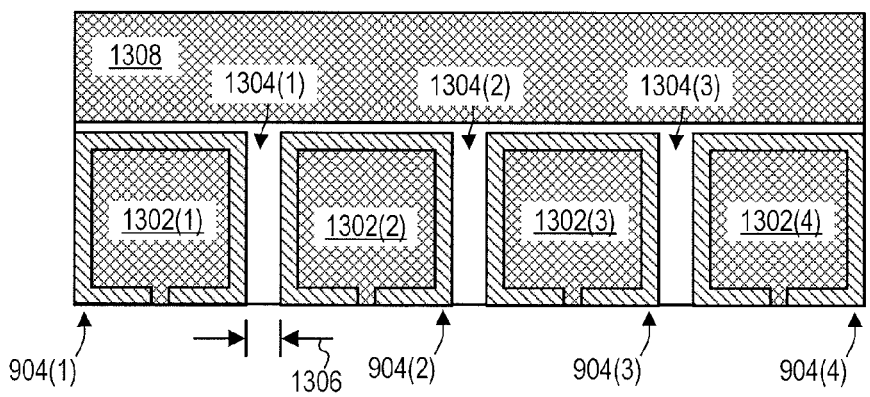
FIG. 13 shows a side cross sectional view of the coupled inductor of FIG. 12.

FIG. 13 shows a cross sectional view of inductor 800, taken along line B-B of FIG. 12. Areas 1302 represent areas of connecting magnetic elements 902, which are separated by windows 1304 having a respective width 1306. Area 1308 represents the cross section of top magnetic element 806. Thicknesses of windings 904 are exaggerated in FIG. 13 for illustrative clarity. Each window 1304 need not necessarily have the same width 1306. Window widths 1306 can be made small because connecting magnetic elements 902 do not need to be separated to provide space for leakage sections to elevate leakage inductance. Instead, as discussed above, leakage inductance is primarily created by top magnetic element 806 and gap 808. Indeed, window widths 1306 can be made as small as possible, such as just large enough to prevent windings 904 from shorting. For example, in some embodiments, window widths 1306 are less than 50%, 25%, or 10% of connecting magnetic element widths 1002. Accordingly, in some embodiments, adjacent connecting magnetic elements 902 are separated by a separation distance (i.e., a window width 1306) that is less than 50%, 25%, or 10% of the respective width 1002 of either adjacent connecting magnetic element. Configuring coupled inductor 800 such that window widths 1306 are relatively small may advantageously increase the portion of coupled inductor 800's volume that is utilized for magnetically coupling together windings, as discussed below.

Windings 904 are, for example, single turn, single layer windings having at least substantially rectangular cross section to help minimize winding impedance. FIG. 14 shows a side perspective view of one winding 904, and FIG. 15 shows a partially transparent view of one winding 904. Windings 904 can, however, have other configurations. For example, FIGS. 16-18 show examples of other possible winding configurations. As another example, FIG. 19 shows a top plan view of one coupled inductor 1900, which is a three winding embodiment of coupled inductor 800. Coupled inductor 1900 includes windings 1902 which are, for example, formed from a rectangular sheet of conductive material (e.g., copper). Edges of windings 1902 not visible in the top plan view of FIG. 19 are outlined with dashed lines. Additionally, edges of connecting magnetic elements, which are obscured in the top plan view FIG. 19, also shown with dashed lines.

Although each winding 904 is shown as having an end extending from each of sides 1204 and 1206 of inductor 800 (see FIG. 12), windings 904 could extend from inductor 800 in a different manner, or not extend at all. For example, each end of one or more windings 904 could extend from a common side of inductor 800, such as to accommodate power stage layout requirements. Additionally, windings 904 could be modified to include or be coupled to thru-hole pins.

Figure 20:
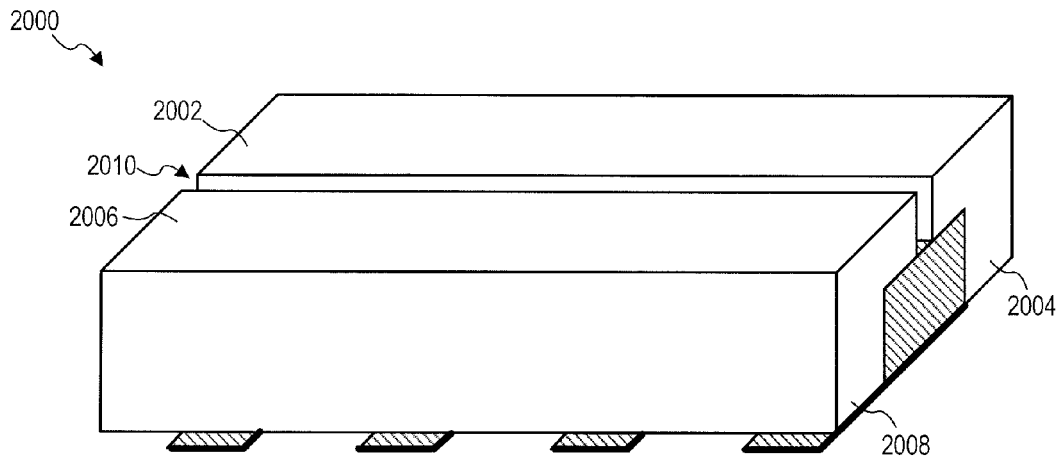
FIG. 20 shows a side perspective view of one coupled inductor including two top magnetic elements, according to an embodiment.

The configuration of top magnetic element 806 could be varied. For example, top magnetic element 806 could be replaced with two or more top magnetic elements, such as shown in FIG. 20. In particular, FIG. 20 shows a side perspective view of one coupled inductor 2000, which is an alternate embodiment of coupled inductor 800. In coupled inductor 2000, a first top magnetic element 2002 extends from a first end magnetic element 2004 over the connecting magnetic elements, and a second top magnetic element 2006 extends from a second end magnetic element 2008 over the connecting magnetic elements. Top magnetic elements 2002, 2006 form a gap 2010.

In embodiments of coupled inductor 800 where M is relatively large, length 812 of inductor 800 will be relatively long to accommodate each of the M connecting magnetic elements 902. Such relatively long length 812 of inductor 800 will increase the cross-sectional area of gap 808 orthogonal to thickness 810, thereby increasing leakage inductance values of windings 904. If leakage inductance is undesirably large, it can be decreased by increasing thickness 810 of gap 808. Thus, as the number of windings are increased, thickness 810 of gap 808 may be increased to maintain a desired leakage inductance.

The configuration of top magnetic element 806, first end magnetic element 802, and/or second end magnetic element 804 can also be varied to determine winding leakage inductance values. For example, an opening can be formed in one or more of end magnetic elements 802, 804 adjacent to magnetic element 806 to maintain a desired gap cross-sectional area (and thereby maintain desired leakage inductance values) as the number of windings is increased. FIGS. 21-24 show one example of such technique.

Figure 21:
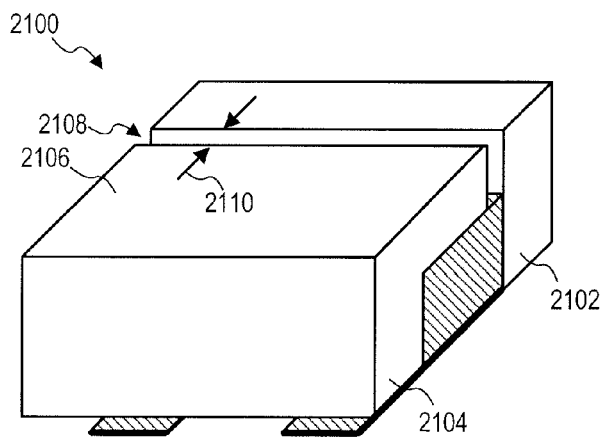
FIG. 21 shows a side perspective view of one two winding coupled inductor, according to an embodiment.

FIG. 21 shows a side perspective view of one coupled inductor 2100, which is a two winding embodiment of coupled inductor 800. Coupled inductor 2100 includes a first end magnetic element 2102, a second end magnetic element 2104, and a top magnetic element 2106 forming a gap 2108. Gap 2108 has a thickness 2110, which primarily determines leakage inductance values of the inductor's windings.

Figure 22:
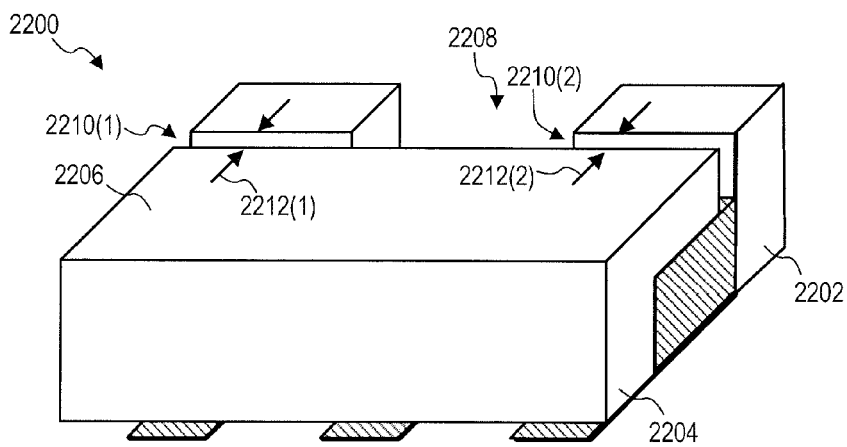
FIG. 22 shows a side perspective view of one three winding coupled inductor where an end magnetic element forms an opening, according to an embodiment.

FIG. 22 shows a side perspective view of one coupled inductor 2200, which is a three winding alternate embodiment of coupled inductor 800. Coupled inductor 2200 includes a first end magnetic element 2202, a second end magnetic element 2204, and a top magnetic element 2206. First end magnetic element 2202 forms an opening 2208, which results in top magnetic element 2206 forming two gaps 2210, each having a respective thickness 2212, which is the same as thickness 2110 of gap 2108 of inductor 2100 (FIG. 21). The size of opening 2208 is selected such that the collective cross-sectional area of both gaps 2210 orthogonal to their thickness 2212 is about the same as the cross sectional area of gap 2108 of inductor 2100 orthogonal to its thickness 2110. Accordingly, coupled inductor 2200 has winding leakage inductance values that are about the same as that of inductor 2100, despite inductor 2200 having more windings and the same gap thickness as inductor 2100.

Figure 23:
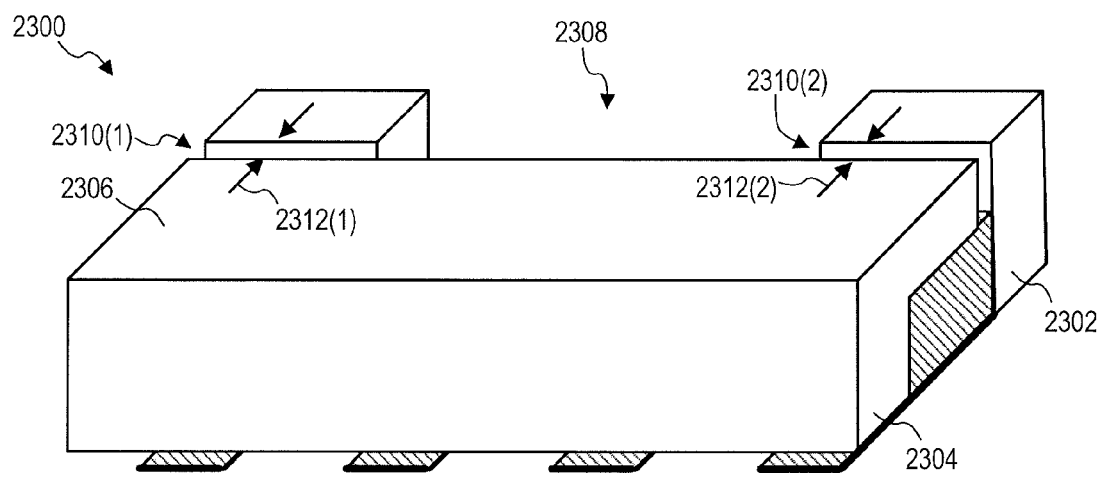
FIG. 23 shows a side perspective view of one four winding coupled inductor where an end magnetic element forms an opening, according to an embodiment.

FIG. 23 shows a side perspective view of one coupled inductor 2300, which is a four winding alternate embodiment of coupled inductor 800 including a first end magnetic element 2302, a second end magnetic element 2304, and a top magnetic element 2306. Coupled inductor 2300 is similar to coupled inductor 2200 (FIG. 22). However, coupled inductor 2300 includes four windings, and the size of an opening 2308 formed in first end magnetic element 2302 is selected such that the collective cross sectional area of gaps 2310 orthogonal to their thickness 2312 is about the same as the cross-sectional area of gap 2108 of inductor 2100 (FIG. 21) orthogonal to its thickness 2110. Thickness 2312 of each gap 2310 is the same as thickness 2110 of gap 2108 of inductor 2100. Accordingly, coupled inductor 2300 has winding leakage inductance values that are about the same as that of coupled inductors 2100 and 2200, despite coupled inductor 2300 having more windings and the same gap thickness as inductors 2100 and 2200.

Figure 24:
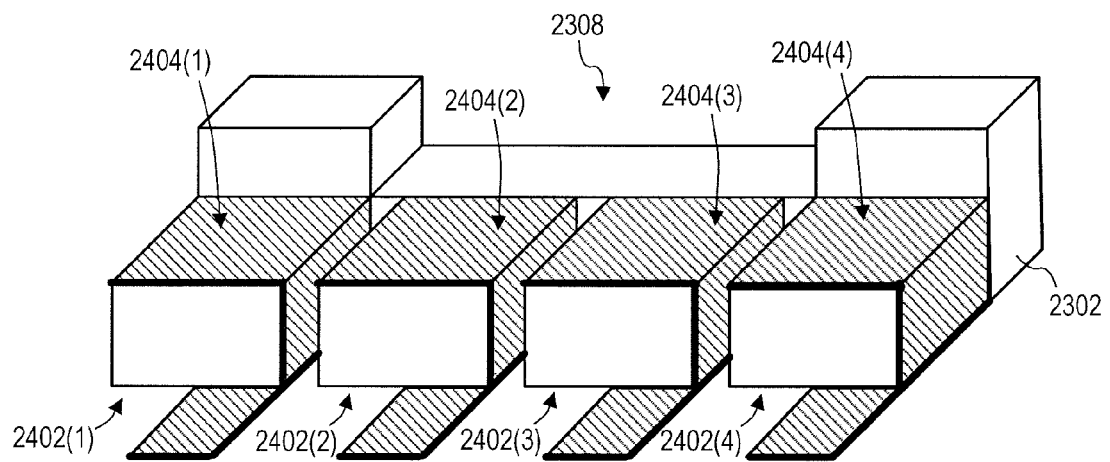
FIG. 24 shows a side perspective view of the coupled inductor of FIG. 23 with magnetic elements removed.

FIG. 24 shows a side perspective view of inductor 2300 with second end magnetic element 2304 and top magnetic element 2306 removed. Connecting magnetic elements 2402 and windings 2404 are visible in FIG. 24.

Thus, as shown from FIGS. 21-24, leakage inductance can be maintained at desired value as the number of windings are increased by adding an opening in an end magnetic element adjacent to the top magnetic element, where the opening size is chosen to achieve a desired total cross-sectional area of all gaps, and thereby achieve desired winding leakage inductances. In embodiments having a large number of windings, the opening size is typically slightly larger than that required to achieve a desired gap cross sectional area because some magnetic flux will travel through the opening.

The configuration of top magnetic element 806 can also be varied to maintain a desired gap cross-sectional area (and thereby maintain desired winding leakage inductance values) as the number of windings are increased. FIGS. 25-30 show one example of such technique.

Figure 25:
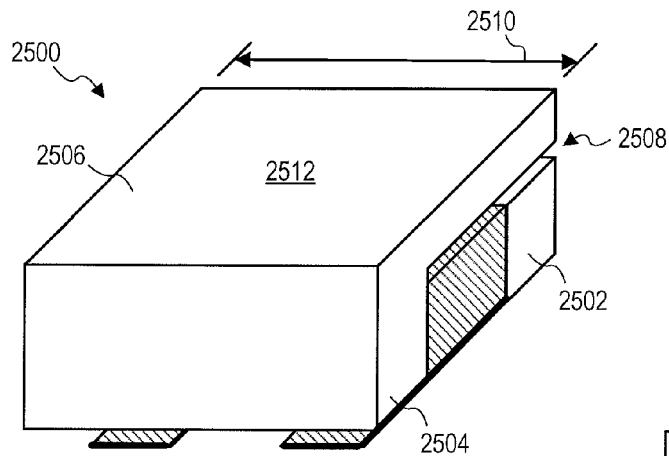
FIG. 25 shows a side perspective view of one two winding coupled inductor, according to an embodiment.
Figure 26:
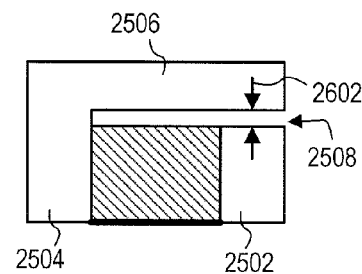
FIG. 26 shows a side plan view of the coupled inductor of FIG. 25.

FIG. 25 shows a side perspective view of one coupled inductor 2500, which is a two winding alternate embodiment of coupled inductor 800 (FIG. 8). FIG. 26 shows a side plan view of coupled inductor 2500. Coupled inductor 2500 includes a first end magnetic element 2502, a second end magnetic element 2504, and a top magnetic element 2506 forming a gap 2508. A spacer (not shown), such as formed of a non-magnetic material, may optionally be included in gap 2508 to facilitate control of gap 2508 during manufacturing of inductor 2500. Gap 2508 spans an entire length 2510 of coupled inductor 2500, and gap 2508 has a thickness 2602 (see FIG. 26). The entirety of top outer surface 2512 is, for example, at least substantially planar to facilitate automatic placement of coupled inductor 2500 without requiring a sticker on the top of inductor 2500.

Figure 27:
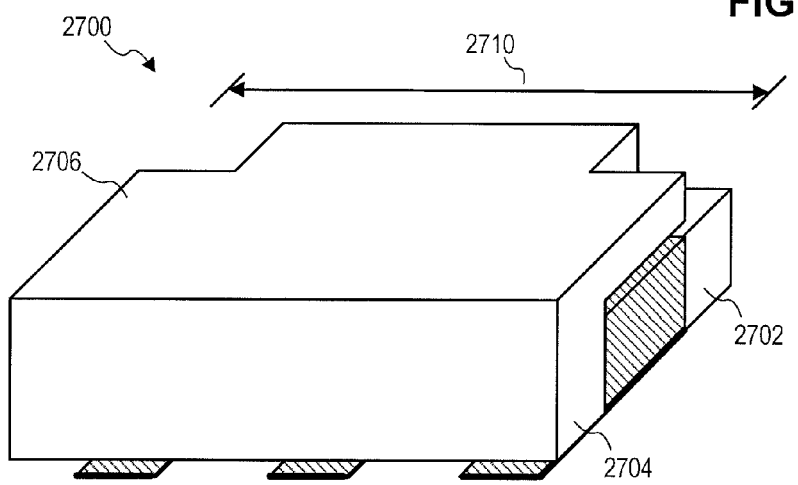
FIG. 27 shows a side perspective view of one three winding coupled inductor, according to an embodiment.
Figure 28:
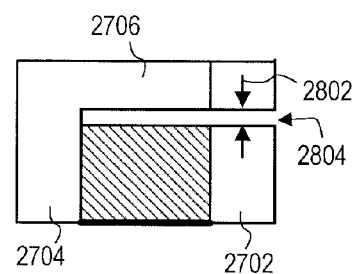
FIG. 28 shows a side plan view of the coupled inductor of FIG. 27.

FIG. 27 shows a side perspective view and FIG. 28 shows a side plan view of one coupled inductor 2700, which is a three winding alternate embodiment of coupled inductor 2500. Coupled inductor 2700 includes a first end magnetic element 2702, a second end magnetic element 2704, and a top magnetic element 2706 forming a gap 2804 having a thickness 2802 (see FIG. 28), which is the same as thickness 2602 of gap 2508. However, in contrast to coupled inductor 2500, gap 2804 does not span an entire length 2710 of inductor 2700. Instead, top magnetic element 2706 is configured such that a cross-sectional area of gap 2804 orthogonal to its thickness 2802 is about the same as the cross sectional area of gap 2508 of inductor 2500 orthogonal to its thickness 2602. Accordingly, the winding leakage inductance values of inductor 2700 are about the same as that of inductor 2500, despite inductor 2700 having more windings and the same gap thickness as inductor 2500.

Figure 29:
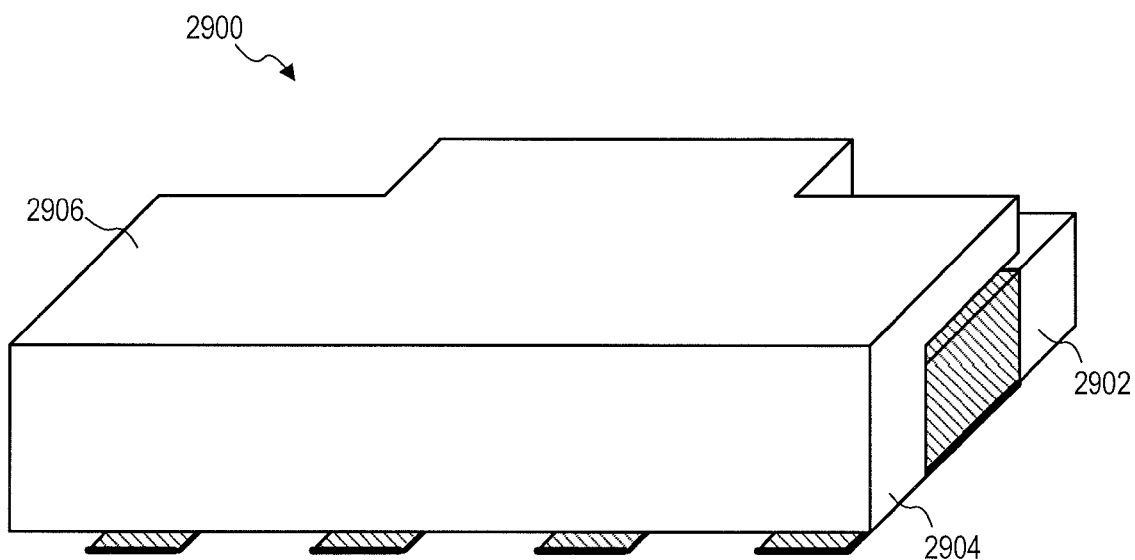
FIG. 29 shows a side perspective view of one four winding coupled inductor, according to an embodiment.
Figure 30:
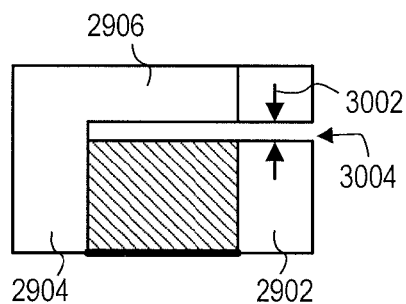
FIG. 30 shows a side plan view of the coupled inductor of FIG. 29.

FIG. 29 shows a side perspective view and FIG. 30 shows a side plan view of one coupled inductor 2900, which is a four winding alternate embodiment of coupled inductor 2500. Coupled inductor 2900 includes a first end magnetic element 2902, a second end magnetic element 2904, and a top magnetic element 2906 forming a gap 3004 having a thickness 3002 (see FIG. 30), which is the same as thickness 2602 of gap 2508. Similar to inductor 2700 (FIG. 27), top magnetic element 2906 is configured such that a cross-sectional area of gap 3004 orthogonal to its thickness 3002 is about the same as the cross-sectional area of gap 2508 of inductor 2500 (FIG. 25) orthogonal to its thickness 2602. Accordingly, the winding leakage inductance values of inductor 2900 are about the same as that of inductors 2500 and 2700, despite inductor 2900 has more windings and the same gap thickness as inductors 2500 and 2700.

Figure 31:
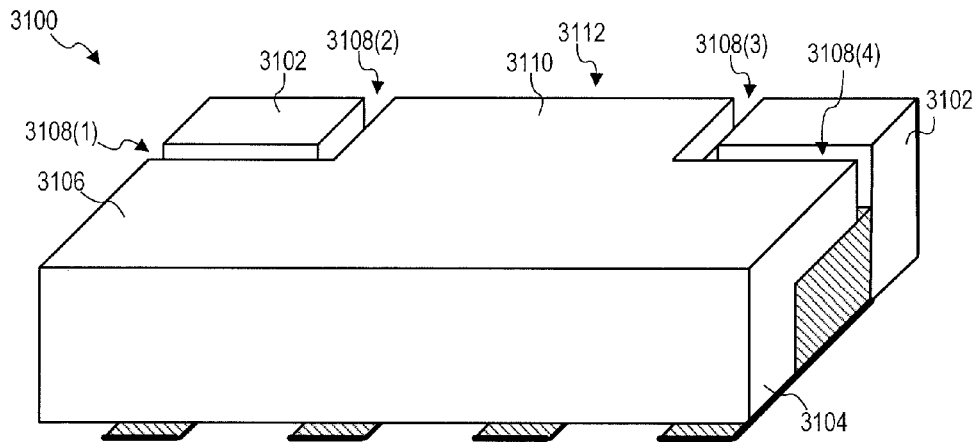
FIG. 31 shows a side perspective view of one four winding coupled inductor, according to an embodiment.
Figure 32:
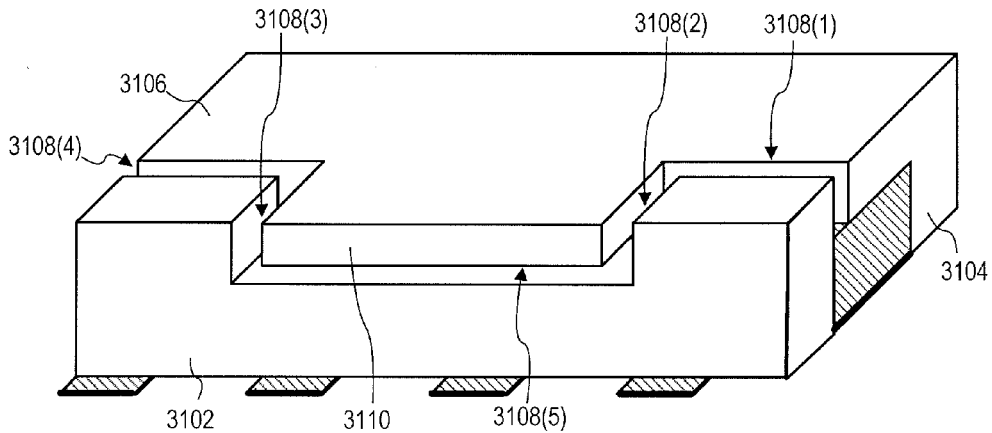
FIG. 32 shows another side perspective view of the coupled inductor of FIG. 31.

FIG. 31 shows a side perspective view of one coupled inductor 3100, which is an alternate embodiment of coupled inductor 800 (FIG. 8) and includes some features of both coupled inductor 2300 (FIG. 23) and coupled inductor 2900 (FIG. 29). Coupled inductor 3100 includes a first end magnetic element 3102, a second end magnetic element 3104, and a top magnetic element 3106 which provides a path for magnetic flux to travel between first end magnetic element 3102 and second end magnetic element 3104. Top magnetic element 3106 further forms gaps 3108. Top magnetic element 3106 forms an extension 3110 which extends into an opening 3112 in first end magnetic element 3102, but does not contact first end magnetic element 3102. FIG. 32 shows inductor 3100 from a side perspective opposite of that of FIG. 31. Due to the relatively large collective cross-sectional area of gaps 3108, winding leakage inductance values of inductor 3100 may be relatively large. However, the large number of gaps 3108 of inductor 3100 may provide significant flexibility in determining winding leakage inductance values.

Figure 33:
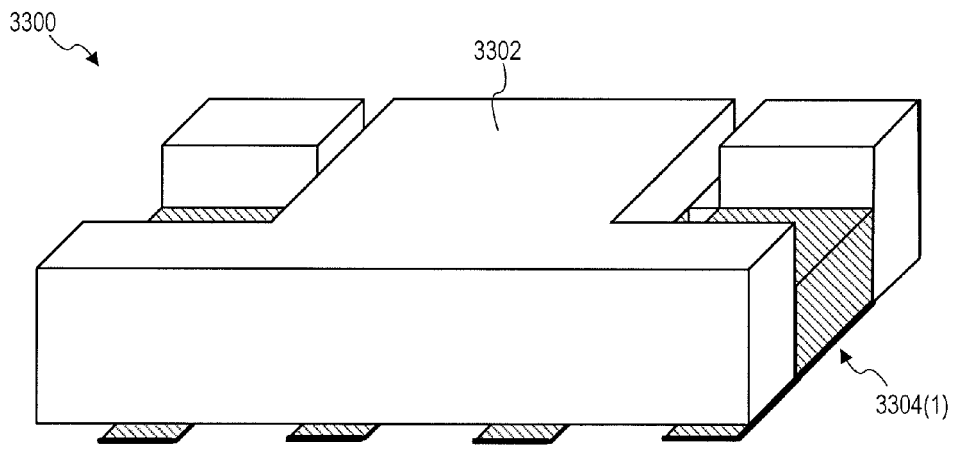
FIG. 33 shows a side perspective view of an alternate embodiment of the coupled inductor of FIG. 31.

FIG. 33 is a side perspective view of one coupled inductor 3300, which is an alternate embodiment of coupled inductor 3100 (FIG. 33). Coupled inductor 3300 is similar to coupled inductor 3100. However, in contrast to coupled inductor 3100, a top magnetic element 3302 of coupled inductor 3300 does not extend over all connecting magnetic elements 3304, thereby reducing gap cross-sectional area. Accordingly, coupled inductor 3300 generally has smaller leakage inductance values than a similar embodiment of coupled inductor 3100.

Coupled inductor 800 may have a number of potential advantages over other coupled inductors. One potential advantage is that coupled inductor 800 may have a smaller footprint than other coupled inductors with similar inductance and current capability characteristics. In particular, leakage inductance is primarily created and controlled via top element 806 and gap 808. Consequently, other features for increasing leakage inductance, which typically increase inductor footprint size, are not required. For example, gapped outer legs added to the inductor's ends or leakage sections between windings (see, e.g., inductor 500 of FIGS. 5-7), which are used in other coupled inductors to increase leakage inductance values, are not required in coupled inductor 800.

Figure 2:
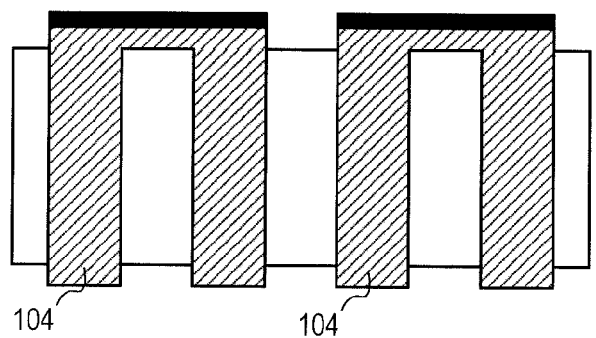
FIG. 2 shows a cross sectional view of the PRIOR ART coupled inductor of FIG. 1.
Figure 3:
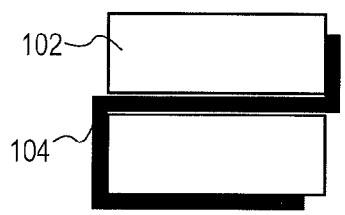
FIG. 3 shows an end plan view of the PRIOR ART coupled inductor of FIG. 1.
Figure 5:
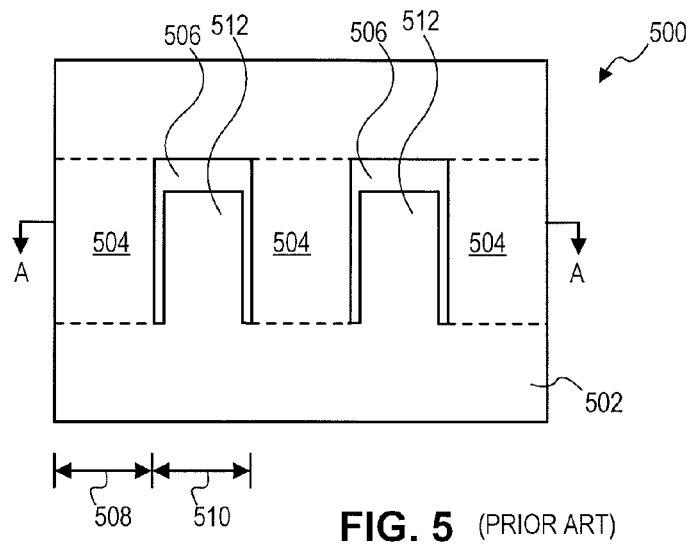
FIG. 5 shows a top plan view of one PRIOR ART multiphase coupled inductor without windings.
Figure 6:
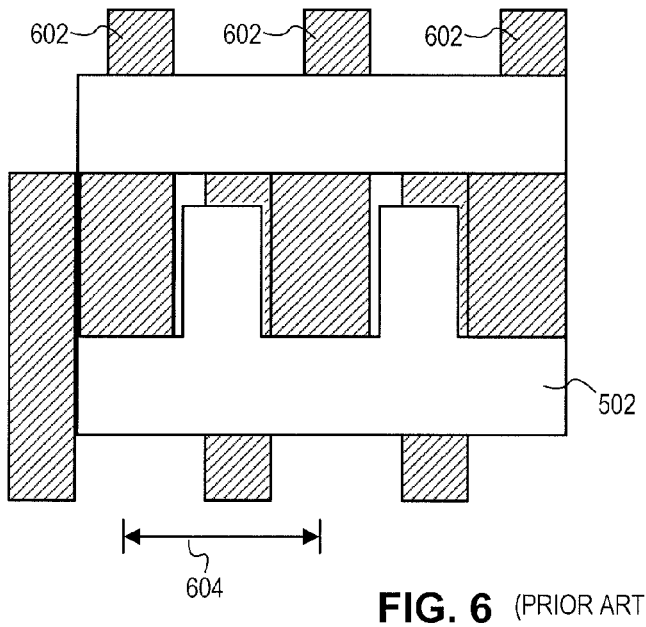
FIG. 6 shows a top plan view of the PRIOR ART coupled inductor of FIG. 5 with windings.
Figure 7:
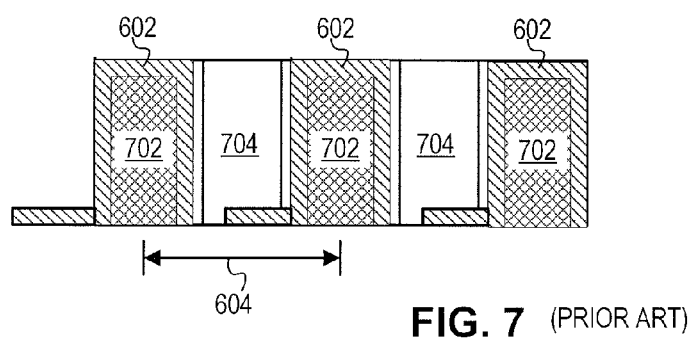
FIG. 7 shows a cross sectional view of the PRIOR ART coupled inductor of FIGS. 5 and 6.

Additionally, as discussed above, leakage inductance is adjustable by varying thickness 810 of gap 808. Accordingly, leakage inductance may be easily adjusted, such as by merely grinding down top magnetic element 806. In contrast, core geometry and/or leakage sections must be changed to adjust leakage inductance of coupled inductor 100 (FIGS. 1-3) or coupled inductor 500 (FIGS. 5-7).

Furthermore, coupled inductor 800 need not have wide window widths 1306 between windings, thereby helping maximize the portion of core cross section available to magnetically couple windings. For example, in FIG. 13, the majority of the cross section is occupied by a magnetic material coupling together windings 904—only windows 1304 do not include magnetic material. Accordingly, inductor 800 may have a larger magnetizing inductance than other inductors with a similar winding pitch, which increases magnetic coupling between windings, increases uniformity of leakage inductance and magnetizing inductance among windings, increases resistance to saturation from winding current mismatch, and/or reduces core losses. Additionally, the large magnetic coupling offered by some embodiments of coupled inductor 800 may allow use of a lower permeability core material, thereby reducing core losses.

In contrast, in some other coupled inductors, such as coupled inductor 100 (FIGS. 1-3) or coupled inductor 500 (FIGS. 5-7), a significant portion of the inductor's volume is not utilized to magnetically couple together windings. Such fact can be appreciated by comparing FIG. 7 and FIG. 13, where coupled inductor 800 includes significantly more magnetic core material coupling windings together than coupled inductor 500 at the same winding pitch.

Figure 4:
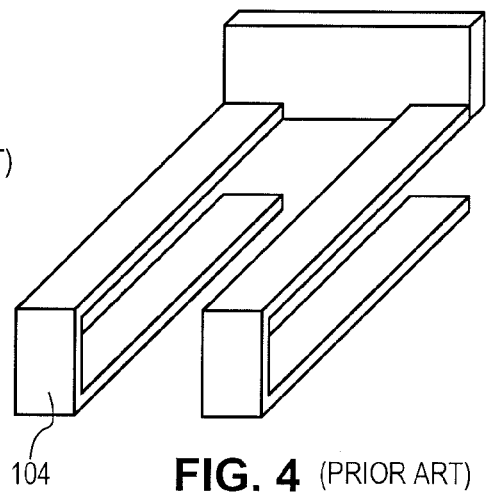
FIG. 4 shows a side perspective view of a winding of the PRIOR ART coupled inductor of FIG. 1.

Moreover, certain embodiments of coupled inductor 800 enable windings 904 to have a short length and a wide width, thereby decreasing winding resistance and associated power loss. In contrast, some prior art coupled inductors require much longer windings, as for example shown by the length of winding 104 of coupled inductor 100 (see FIG. 4).

Additionally, some embodiments of coupled inductor 800 do not require thin magnetic core pieces, thereby facilitating mechanical strength, manufacturing, shipping, handling, and/or assembly. In contrast, some other coupled inductors require thin core pieces that are fragile, difficult to manufacture, ship, handle, and/or assemble. For example, core 102 of coupled inductor 100 (FIG. 1) may require a thin top piece and a thin bottom piece.

Figure 34:
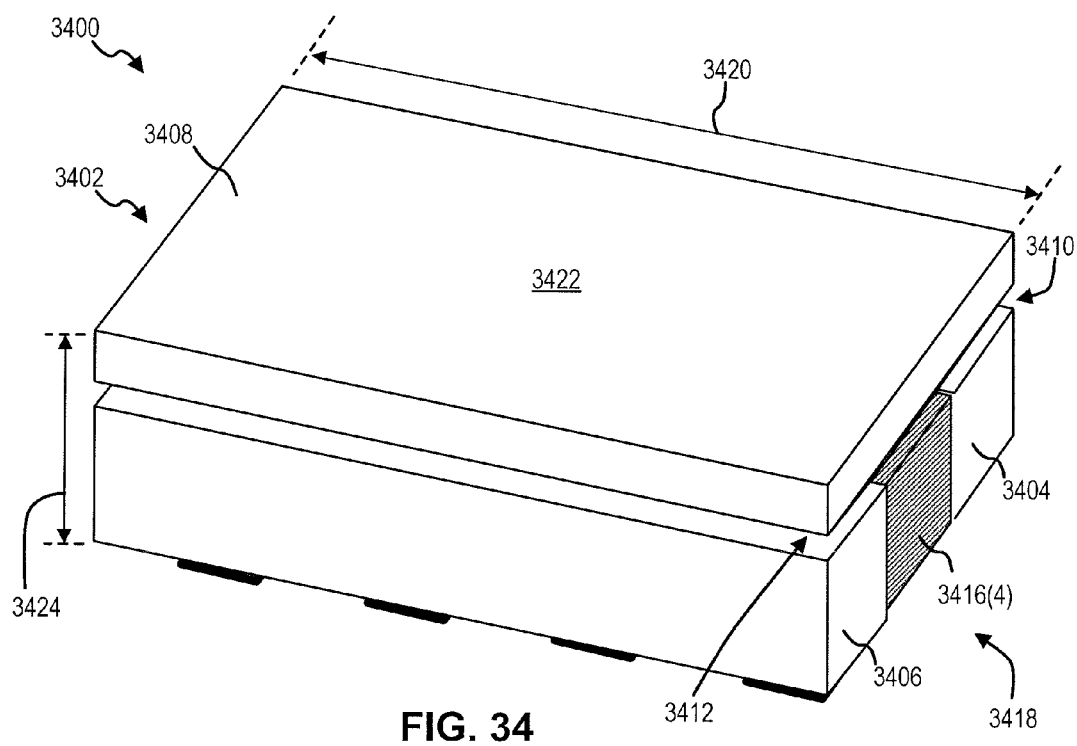
FIG. 34 shows a top perspective view of one coupled inductor, according to an embodiment.

FIG. 34 shows a top perspective view of one M-winding coupled inductor 3400. Coupled inductor 3400 is shown with M being equal to four. However, M could be any integer greater than one. Coupled inductor 3400 is similar to coupled inductor 800 but includes two gaps in series with its primary leakage flux path. Specifically, coupled inductor 3400 includes a magnetic core 3402 including first and second end magnetic elements 3404 and 3406 and a top magnetic element 3408. A first gap 3410 separates top magnet element 3408 from first end magnetic element 3404, and a second gap 3412 separates top magnetic element 3408 from second end magnetic element 3406. First and second gaps 3410, 3412 each include a respective gap material (e.g., air, insulating tape, plastic, glue, and/or paper) having a lower magnetic permeability than a one or more magnetic materials forming magnetic core 3402. Top magnetic element 3408 forms an outer or top surface 3422, and in certain embodiments, at least a portion of surface 3422 is at least substantially planar.

Figure 35:
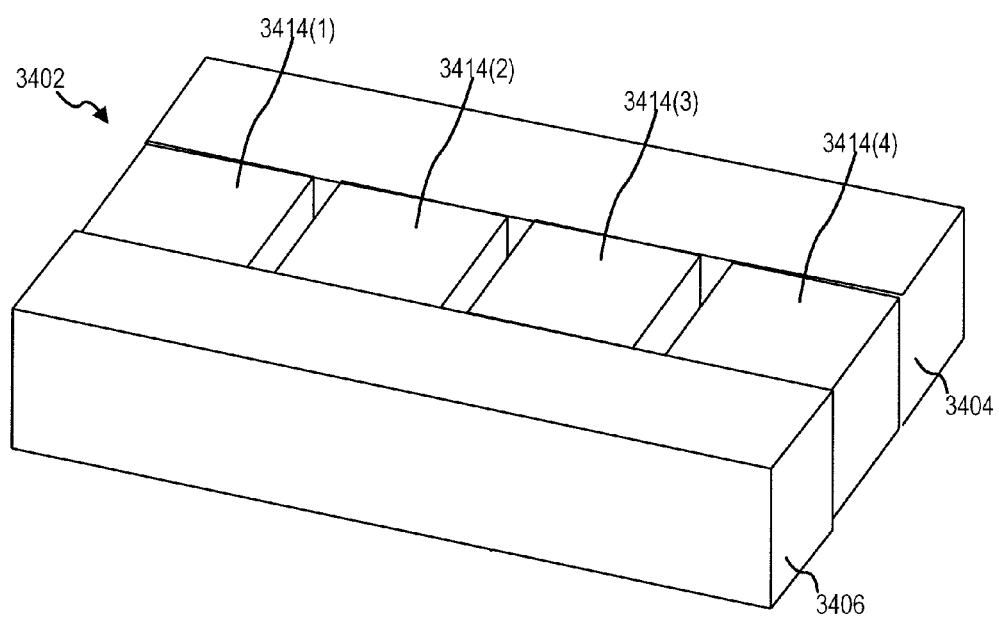
FIG. 35 shows a top perspective view of the magnetic core of the coupled inductor of FIG. 34 with a top magnetic element removed.

FIG. 35 shows a top perspective view of core 3402 with top magnetic element 3408 removed. Core 3502 includes M connecting magnetic elements 3414 disposed between and connecting first and second end magnetic elements 3404, 3406. Thus, top magnetic element 3408 is adjacent to and extends at least partially over each of the connecting magnetic elements 3414. First and second end magnetic elements 3404, 3406 are, for example, parallel to each other such that core 3402 forms a ladder core. Although the magnetic elements of core 3402 are shown as discrete magnetic elements joined to form core 3402, one or more of the magnetic elements could be combined into a single magnetic element (e.g., connecting magnetic elements 3414 and first end magnetic element 3404 could be combined into a single magnetic element).

Figure 36:
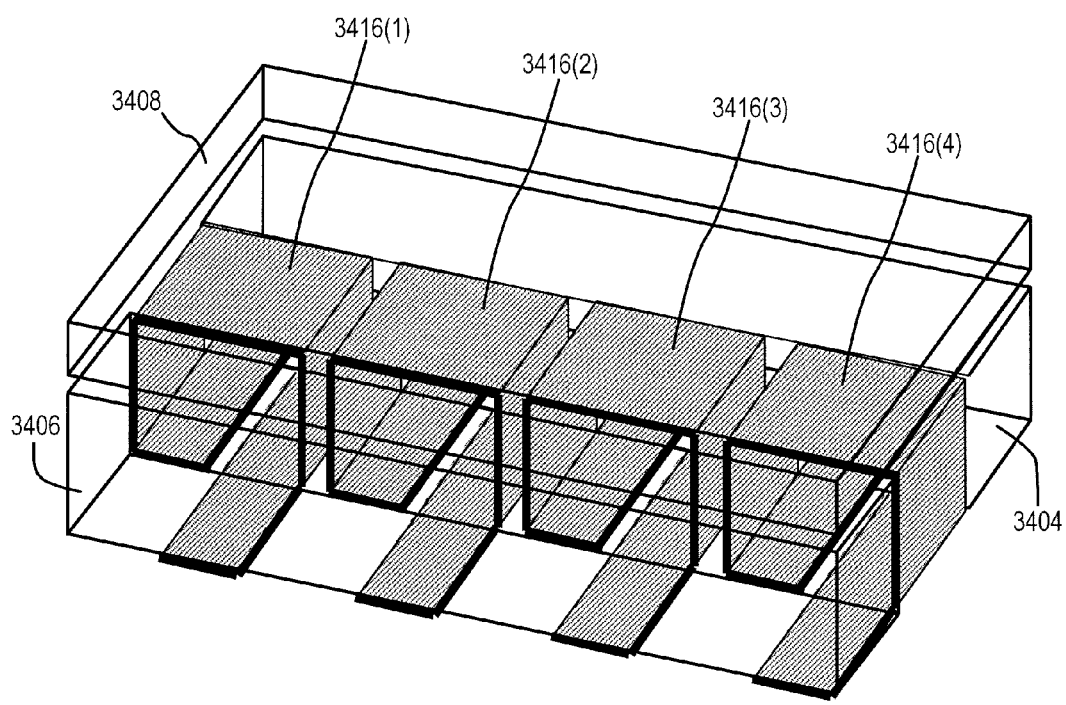
FIG. 36 shows a top perspective view of the coupled inductor of FIG. 34 with its magnetic core shown as transparent.
Figure 37:
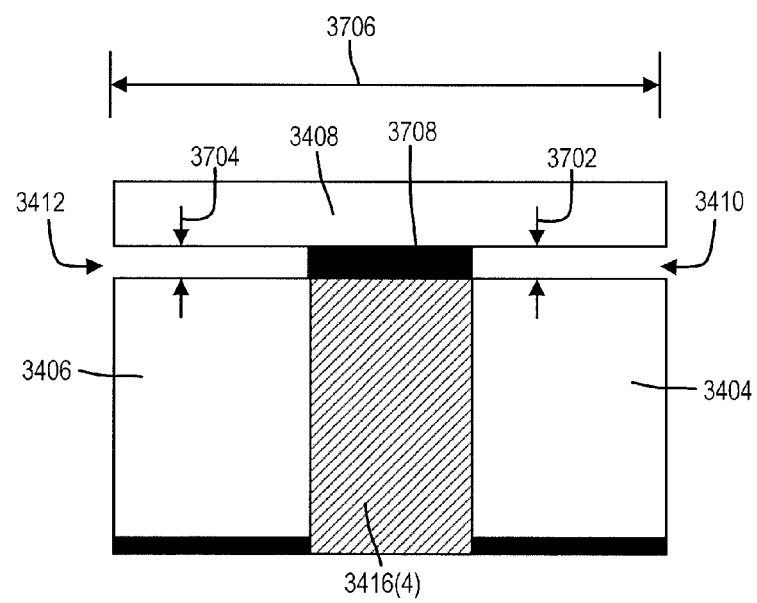
FIG. 37 shows a side of the coupled inductor of FIG. 34.

Coupled inductor 3400 further includes a respective winding 3416 wound at least partially around each connecting magnetic element 3414. FIG. 36 shows a top perspective view of coupled inductor 3400 where magnetic core 3402 is shown as transparent to show windings 3416. The configuration of windings 3416 could be varied, such as to be like those in the examples of FIGS. 16-18. FIG. 37 shows a view of side 3418 of coupled inductor 3400.

Figure 38:
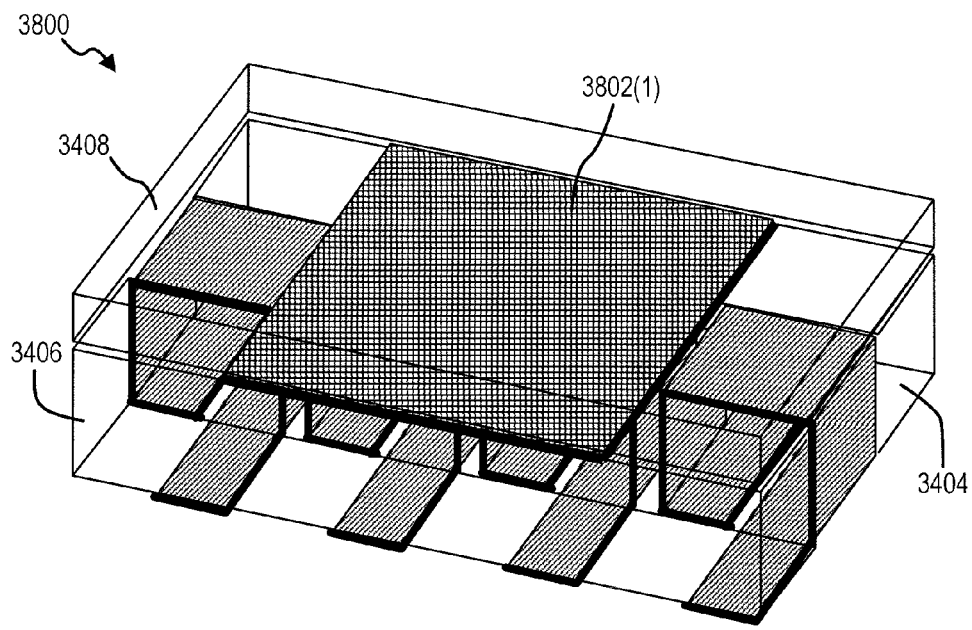
FIGS. 38-40 each show a top perspective view of a respective coupled inductor including at least one non-magnetic spacer.
Figure 39:
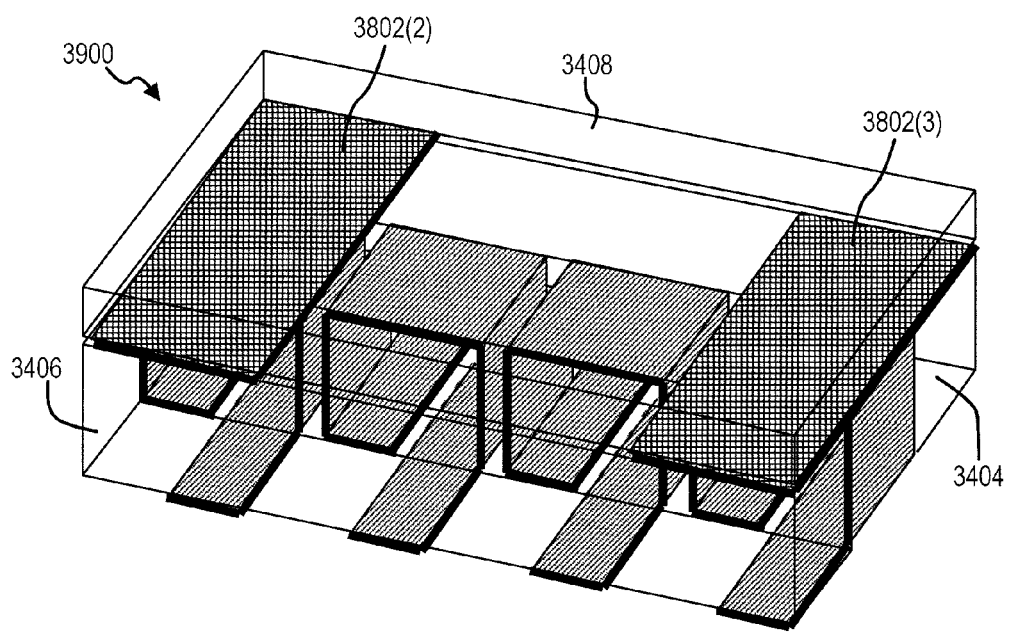
Figure 40:
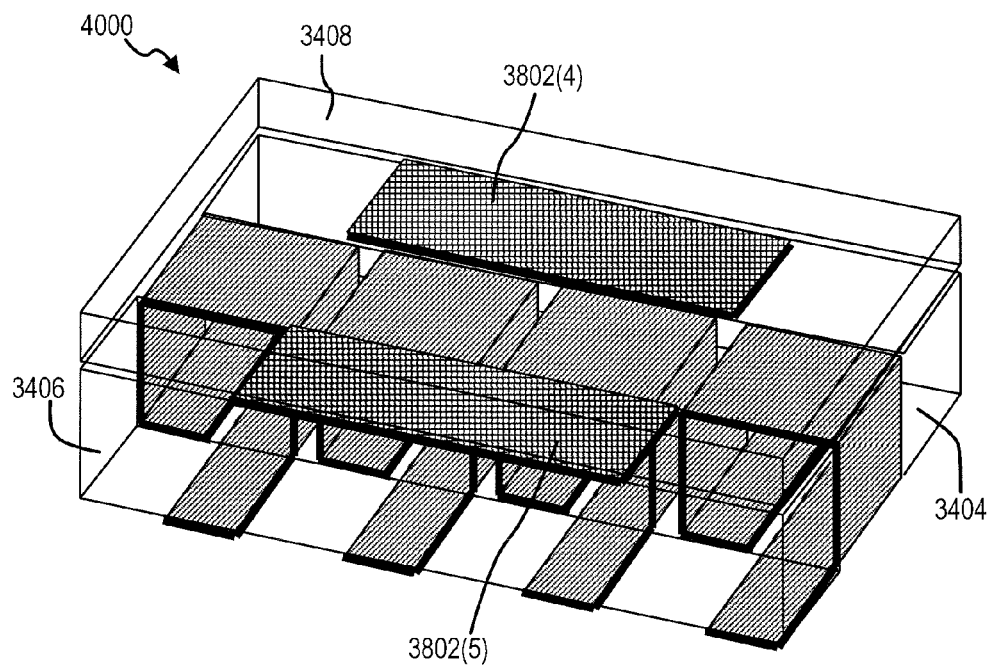

A non-magnetic material 3708 (FIG. 37), such as glue, epoxy, and/or one or more non-magnetic spacers, is typically disposed between top magnetic element 3408 and one or more other elements of core 3402 (e.g., first and second end magnetic elements 3404, 3406) to separate top magnetic element 3408 from first and second end magnetic elements 3404, 3406 and thereby create first and second gaps 3410, 3412. The magnetic spacers are optionally adhesive, and in such case, at least partially secure top magnet element 3408 to first and second end magnetic elements 3404, 3406. Glue may also be used to at least partially secure top magnet element 3408 to first and second end magnetic elements 3404, 3406. FIGS. 38-40 respectively show top perspective views of coupled inductors 3800, 3900, and 4000, each of which is an embodiment of coupled inductor 3400 including one or more non-magnetic spacers 3802 separating top magnet element 3408 from first and second end magnetic elements 3404, 3406. Core 3402 is shown as transparent in FIGS. 38-40 to show non-magnetic spacers 3802.

Figure 41:
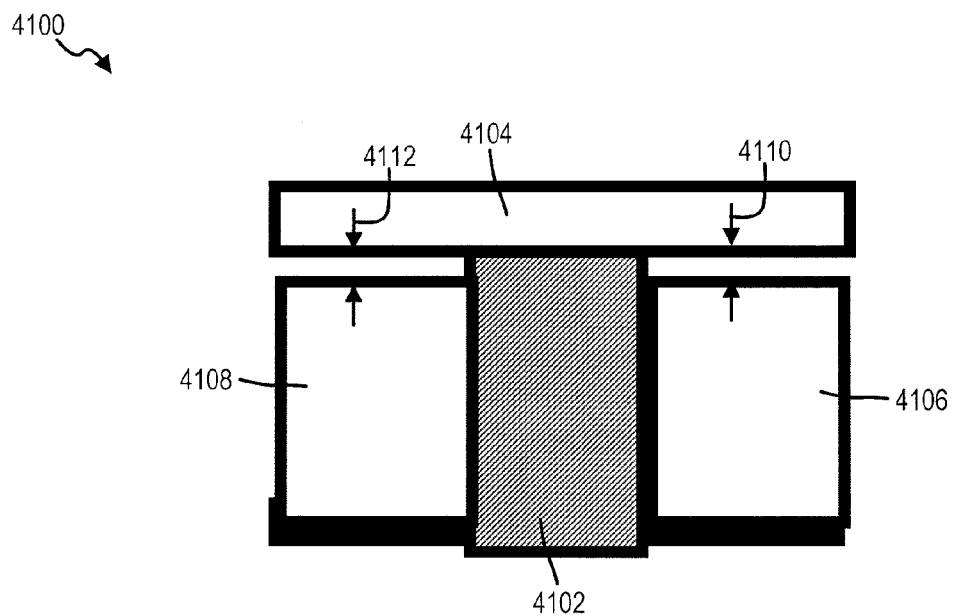
FIG. 41 shows a side view of an alternate embodiment of the coupled inductor of FIG. 34.
Figure 42:
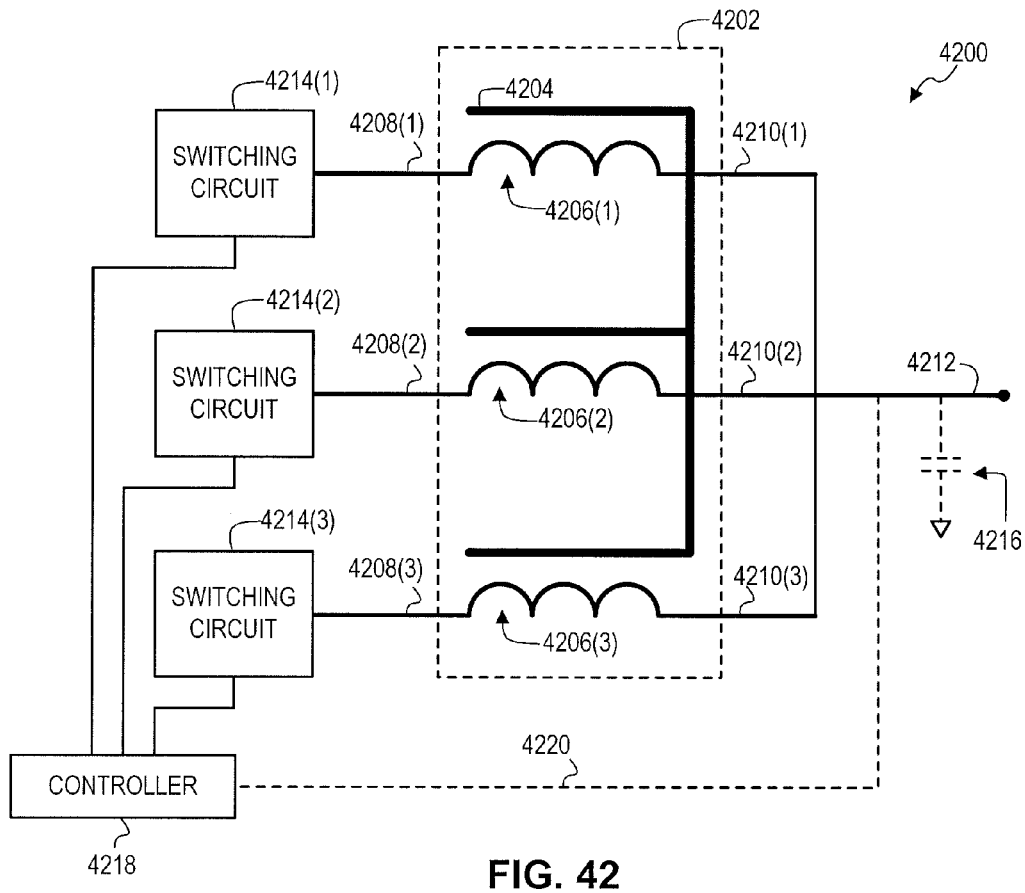
FIG. 42 shows one power supply, according to an embodiment.

In certain alternate embodiments, at least one of the coupled inductor's windings serves as a spacer between the top magnetic element and one or more other elements of the core. For example, FIG. 41 shows a side view of a coupled inductor 4100, which is an alternate embodiment of coupled inductor 3400, where windings 4102 (analogous to windings 3416) help separate a top magnetic element 4104 from first and second end magnetic elements 4106, 4108. An adhesive material (not shown), such as glue or epoxy, is typically used to hold top magnetic element 4104 to the remainder of coupled inductor 4100. Such adhesive material typically also helps separate top magnetic element 4104 from end magnetic elements 4106, 4108. Use of windings 4102 as spacers between top magnetic element 4104 and end magnetic elements 4106, 4108 may facilitate precise control of gap thicknesses 4110, 4112.

Top magnetic element 3408 provides a path for magnetic flux to travel between first end magnetic element 3404 and second end magnetic element 3406. Thus, top magnetic element 3408 provides a path for leakage magnetic flux, and first and second gaps 3410, 3412 are each in series with the leakage flux path of top magnetic element 3408. Thus, top magnetic element 3408 and first and second gaps 3410, 3412 are typically the most significant contributors to the respective leakage inductance of each winding 3416. Accordingly, leakage inductance may be varied by varying a thickness 3702 of gap first gap 3410 and/or a thickness 3704 of second gap 3412 (see FIG. 37), where leakage inductance increases in proportion to thicknesses 3702, 3704. Due to coupled inductor 3400 including two gaps 3410, 3412 in its leakage flux path, gaps 3410, 3412 will typically be thinner than a gap in the leakage flux path of an inductor including only a single gap in its leakage flux path.

Although thicknesses 3702, 3704 are shown as being the same in FIG. 37, thickness 3702 need not be the same as thickness 3704. Additionally, although each of first and second gaps 3410, 3412 are shown as extending along the entirety of a length 3420 of coupled inductor 3400, one or more of first and second gaps 3410, 3412 may be modified to extend along only part of length 3420. Furthermore, one or more of first and second gaps 3410, 3412 may have a thickness 3702, 3704 that is non-uniform along width 3420 and/or along a depth 3706 of coupled inductor 3400, such as to create non-linear leakage inductance values. Moreover coupled inductor 3400 coupled be modified to include one or more gaps in addition to first and second gaps 3410, 3412 in the leakage flux path of top magnetic element 3408.

Certain embodiments of coupled inductor 3400 have advantages similar to those discussed above with respect to coupled inductor 800, such as a smaller footprint than some other coupled inductors with similar inductance and current capability characteristics, the ability to easily adjust leakage inductance, the ability to place adjacent windings close together, and the ability to use short and/or wide windings. Furthermore, as discussed below, certain embodiments of coupled inductor 3400 have additional advantages that are not necessarily realized by certain embodiments of coupled inductor 800.

For example, in certain embodiments of coupled inductor 3400, at least a portion of top surface 3422 is free from gaps and is substantially flat (gaps 3410, 3412 are to the side of surface 3422), thereby potentially allowing pick and place assembly without requiring use of a label or cover on surface 3422. Not having to use a label or cover may advantageously reduce material and labor cost, reduce height 3424 of coupled inductor 3400, and/or promote transfer of heat from top surface 3422 to the inductor's environment.

As another example, certain embodiments of coupled inductor 3400 include a core formed from a number simple shaped (e.g., substantially rectangular) magnetic elements, thereby promoting low core cost and manufacturability. Such magnetic elements may be symmetrical, thereby reducing the number of magnetic elements required to faun core 3402. For instance, in certain embodiments, first and second end magnetic elements 3404, 3406 are interchangeable, thereby reducing the number of different magnetic elements stocked to form core 3402.

As yet another example, the fact that gap thicknesses 3702, 3704 are determined by the position of top magnetic element 3408 relative to first and second end magnetic elements 3404, 3406 may allow relatively easy control of the gap thicknesses. For example, in certain embodiments, gap thicknesses are controlled primarily by thickness of non-magnetic spacers and/or glue separating top magnetic element 3408 from first and second end magnetic elements 3404, 3406.

As another example, use of two gaps 3410, 3412, instead of a single gap, may reduce stray magnetic fields emitted from coupled inductor 3400. In particular, as discussed above, gaps 3410, 3412 are typically thinner than a gap in the leakage flux path of an inductor including only a single gap in its leakage flux path. Such smaller gaps may reduce stray magnetic fields, which in turn may reduce electromagnetic interference from coupled inductor 3400. A reduction in stray magnetic fields may also reduce losses in adjacent metal parts resulting from current induced in the metal parts from the stray magnetic fields.

One possible application of the coupled inductors disclosed herein is in power supplies, such as in switching DC-to-DC converters. Accordingly, the magnetic material used to form the magnetic cores of the coupled inductors disclosed herein is typically a material (e.g., a ferrite material or a powdered iron material) that exhibits a relatively low core loss at high switching frequencies (e.g., at least 20 KHz) that are common in switching power supplies.

FIG. 41 schematically shows one power supply 4200, which is one possible application of the coupled inductors discussed herein. Although power supply 4200 is shown as having three phases, power supply 4200 can have any number of phases greater than one.

Power supply 4200 includes a coupled inductor 4202, which is, for example, a three winding embodiment of one of the coupled inductors discussed herein (e.g., a three winding embodiment of one of coupled inductors 800, 1900, 2000, 2100, 2200, 2300, 2500, 2700, 2900, 3100, 3300, 3400, or 4100). Coupled inductor 4202 includes a magnetic core 4204 and three windings 4206. Each winding 4206 has a first end 4210 electrically coupled to a common first node 4212. Each first end 4210 optionally extends from one common side of inductor 4202 (e.g., side 1204, FIG. 12). Each winding 4206 further includes a second end 4208 electrically coupled to a respective switching circuit 4214. Each second end 4208 optionally extends from another common side of inductor 4202 (e.g., side 1206, FIG. 12). Windings 4206 are wound on core 4204 such that an electric current flowing through one winding 4206 from its second end 4208 to its first end 4210 induces a current in each other winding 4206 flowing from its second end 4208 to its first end 4210. Switching circuits 4214 are configured and arranged to switch second end 4208 of their respective winding 4206 between at least two different voltages. Controller 4218 controls switching circuits 4214, and controller 4218 optionally includes a feedback connection 4220, such as to first node 4212. First node 4212 optionally includes a filter 4216.

Power supply 4200 typically has a switching frequency, the frequency at which switching circuits 4214 switch, of at least about 20 kHz, such that sound resulting from movement of components due to switching currents is above a frequency range perceivable by humans. Operating switching power supply 4200 at a high switching frequency (e.g., at least 20 kHz) instead of at a low switching frequency may also facilitate (1) a reduction in size of energy storage components (e.g., coupled inductor 4202 and filter capacitors), (2) a reduction in ripple current and ripple voltage magnitude, and/or (3) improved converter transient response. To enable efficient operation at high switching frequencies, the one or more magnetic materials forming a magnetic core 4204 of coupled inductor 4202 are typically materials having relatively low core losses at high frequency operation.

In some embodiments, controller 4218 controls switching circuits 4214 such that each switching circuit 4214 operates out of phase from each other switching circuit 4214. Stated differently, in such embodiments, the switched waveform provided by each switching circuit 4214 to its respective second end 4208 is phase shifted with respect to the switched waveform provided by each other switching circuit 4214 to its respective second end 4208. For example, in certain embodiments of power supply 4200, switching circuit 4214(1) provides a switched waveform to second end 4208(1) that is about 120 degrees out of phase with a switched waveform provided by switching circuit 4214(2) to second end 4208(2) and a switched waveform provided by switching circuit 4214 (3) to second end 4208(3).

Power supply 4200 can be configured and arranged to have a variety of configurations. For example, switching circuits 4214 may switch second end 4208 of their respective winding 4206 between an input voltage node (not shown) and ground, such that power supply 4200 is configured as a buck converter, first node 4212 is an output voltage node, and filter 4216 is an output filer. In this example, each switching circuit 4214 includes at least one high side switching device and at least one catch diode, or at least one high side switching device and at least one low side switching device. In the context of this document, a switching device includes, but is not limited to, a bipolar junction transistor, a field effect transistor (e.g., an N-channel or P-channel metal oxide semiconductor field effect transistor, a junction field effect transistor, a metal semiconductor field effect transistor), an insulated gate bipolar junction transistor, a thyristor, or a silicon controlled rectifier.

As another example, power supply 4200 can be configured as a boost converter such that node 4212 is an input power node, and switching circuits 4214 switch second end 4208 of their respective winding 4206 between an output voltage node (not shown) and ground. Additionally, power supply 4200 can be configured, for example, as a buck-boost converter such that node 4212 is a common node, and switching circuits 4214 switch second end 4208 of their respective winding 4206 between an output voltage node (not shown) and an input voltage node (not shown).

Furthermore, as yet another example, power supply 4200 may form an isolated topology. For example, each switching circuit 4214 may include a transformer, at least one switching device electrically coupled to the transformer's primary winding, and a rectification circuit coupled between the transformer's secondary winding and second end 4208 of a respective winding 4206. The rectification circuit optionally includes at least one switching device to improve efficiency.

Figure 43:
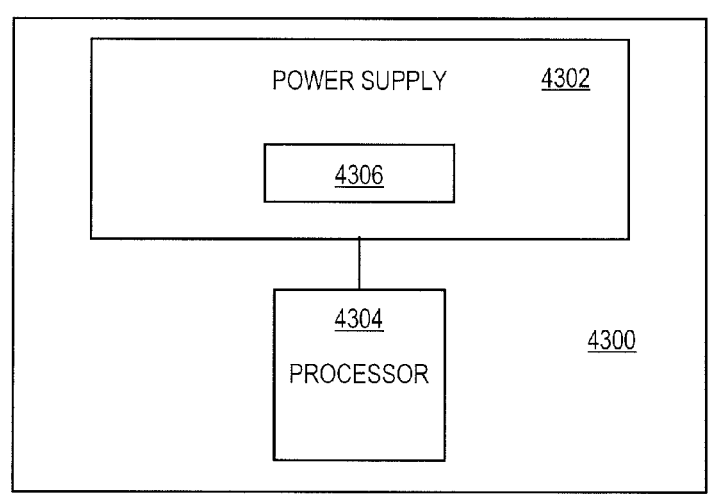
FIG. 43 shows one computing apparatus embodying a coupled inductor, according to an embodiment.

One possible application of power supply 4200 is a computing apparatus, such as computing apparatus 4300 of FIG. 43. Computing apparatus 4300 is, for example, a personal computer or server motherboard, a server processing board, a mobile telephone with computing capability, or a personal digital assistant. Power supply 4302, which is an embodiment of power supply 4200, at least partially powers processor 4304. Power supply 4302 includes a coupled inductor 4306, which is, for example, an embodiment of one of the coupled inductors discussed herein (e.g., an embodiment of one of coupled inductors 800, 1900, 2000, 2100, 2200, 2300, 2500, 2700, 2900, 3100, 3300, 3400, or 4100).

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. An M-winding coupled inductor having a length and a depth, M being an integer greater than one, the coupled inductor comprising:
    a first end magnetic element;
    a second end magnetic element;
    M connecting magnetic elements disposed along the length of the coupled inductor, each connecting magnetic element disposed between and connecting the first and second end magnetic elements;
    M windings, each winding wound at least partially around a respective one of the M connecting magnetic elements; and
    at least one top magnetic element adjacent to and extending at least partially over, when seen looking perpendicular to a plane including the length and the depth, at least two of the M connecting magnetic elements to provide a path for magnetic flux between the first and second end magnetic elements.

2. The coupled inductor of claim 1, the at least one top magnetic element separated from the first end magnetic element by a first gap, the at least one top magnetic element separated from the second end magnetic element by a second gap, each of the first and second gaps including a respective gap material having a lower magnetic permeability than a one or more magnetic materials forming the magnetic elements.

3. The coupled inductor of claim 2, each winding having a respective leakage inductance value that is a function of a thickness of the first gap and a function of a thickness of the second gap.

4. The coupled inductor of claim 3, further comprising a non-magnetic material selected from the group consisting of glue and a non-magnetic spacer, the non-magnetic material separating the at least one top magnetic element from the first and second end magnetic elements.

5. The coupled inductor of claim 1, each connecting magnetic element having a respective width, adjacent connecting magnetic elements being separated by a separation distance that is less than 10% of the respective width of either adjacent connecting magnetic element.

6. The coupled inductor of claim 1, the at least one top magnetic element forming a gap including a gap material, the gap material having a lower magnetic permeability than a one or more magnetic materials forming the magnetic elements.

7. The coupled inductor of claim 6, each winding having a respective leakage inductance value that is a function of a thickness of the gap.

8. The coupled inductor of claim 7, M being an integer greater than two.

9. The coupled inductor of claim 8, at least one of the first and second end magnetic elements forming an opening adjacent to the at least one top magnetic element.

10. The coupled inductor of claim 1, the at least one top magnetic element comprising a first and a second top magnetic element forming a gap therebetween.

11. The coupled inductor of claim 1, the at least one top magnetic element comprising a single top magnetic element.

12. The coupled inductor of claim 1, each winding being a single layer and single turn winding having rectangular cross section.

13. The coupled inductor of claim 1, the at least one top magnetic element forming an outer surface, at least a portion of the outer surface being planar.

14. The coupled inductor of claim 1, each connecting magnetic element having a respective width, adjacent connecting magnetic elements being separated by a separation distance that is less than 25% of the respective width of either adjacent connecting magnetic element.

15. The coupled inductor of claim 1, the at least one top magnetic element adjacent to and extending over all of the M connecting magnetic elements.

16. The coupled inductor of claim 1, the at least one top magnetic element adjacent to and extending over fewer than all of the M connecting magnetic elements.

17. The coupled inductor of claim 16, at least one of the first and second end magnetic elements forming an opening adjacent to the at least one top magnetic element.

18. An M-winding coupled inductor, M being an integer greater than one, the coupled inductor comprising:
    a first end magnetic element;
    a second end magnetic element;
    M connecting magnetic elements, each connecting magnetic element disposed between and connecting the first and second end magnetic elements;
    M windings, each winding wound at least partially around a respective one of the M connecting magnetic elements; and
    at least one top magnetic element adjacent to and extending at least partially over at least two of the M connecting magnetic elements to provide a path for magnetic flux between the first and second end magnetic elements;
    the at least one top magnetic element separated from the first end magnetic element by a first gap,
    the at least one top magnetic element separated from the second end magnetic element by a second gap,
    each of the first and second gaps including a respective gap material having a lower magnetic permeability than a one or more magnetic materials forming the magnetic elements, each winding having a respective leakage inductance value that is a function of a thickness of the first gap and a function of a thickness of the second gap, and at least one of the M windings serving as a spacer between the at least one top magnetic element and the first and second end magnetic elements.

19. An M-phase power supply, M being an integer greater than one, the power supply comprising:

a coupled inductor having a width and a depth, the coupled inductor including:

a first end magnetic element, a second end magnetic element,

M connecting magnetic elements disposed along the length of the coupled inductor, each connecting magnetic element disposed between and connecting the first and second end magnetic elements, M windings, each winding wound at least partially around a respective one of the M connecting magnetic elements, each winding having a respective first end, a respective second end, each first end electrically coupled to a common first node, and at least one top magnetic element adjacent to and extending at least partially over, when seen looking perpendicular to a plane including the length and the depth, at least two of the M connecting magnetic elements to provide a path for magnetic flux between the first and second end magnetic elements; and M switching circuits, each switching circuit electrically coupled to the second end of a respective winding and configured to switch the second end between at least two different voltages.

20. The power supply of claim 19, M being an integer greater than two.

21. The power supply of claim 19, the at least one top magnetic element separated from the first end magnetic element by a first gap, the at least one top magnetic element separated from the second magnetic element by a second gap, each of the first and second gaps including a respective gap material having a lower magnetic permeability than a one or more magnetic materials forming the magnetic elements, each winding having a respective leakage inductance value that is a function of a thickness of the first gap and a function of a thickness of a second gap.

22. The power supply of claim 19, the at least one top magnetic element forming a gap including a gap material having a lower magnetic permeability than a one or more magnetic materials forming the magnetic elements, and each winding having a respective leakage inductance value that is a function of a thickness of the gap.

23. The power supply of claim 19, each connecting magnetic element having a respective width, adjacent connecting magnetic elements being separated by a separation distance that is less than 25% of the respective width of either adjacent connecting magnetic element.

24. The power supply of claim 19, each switching circuit configured to switch its respective second end between at least two different voltages at a frequency of at least 20 kilohertz.

25. The power supply of claim 19, the power supply configured to operate as a DC-to-DC converter selected from the group consisting of a buck converter, a boost converter, and a buck-boost converter.

* * * * *